WITNESSES
Robert C. Baird
W. R. Crout

INVENTORS
Carl C. Smith &
Daniel H. McKeough.
BY
Ralph H. Swingle
ATTORNEY

Aug. 22, 1961 C. C. SMITH ET AL 2,997,563

CIRCUIT INTERRUPTERS

Filed May 27, 1955 15 Sheets-Sheet 3

Aug. 22, 1961 C. C. SMITH ET AL 2,997,563

CIRCUIT INTERRUPTERS

Filed May 27, 1955 15 Sheets-Sheet 5

Aug. 22, 1961 C. C. SMITH ET AL 2,997,563

CIRCUIT INTERRUPTERS

Filed May 27, 1955 15 Sheets-Sheet 6

Aug. 22, 1961 C. C. SMITH ET AL 2,997,563

CIRCUIT INTERRUPTERS

Filed May 27, 1955 15 Sheets-Sheet 7

Aug. 22, 1961 C. C. SMITH ET AL 2,997,563

CIRCUIT INTERRUPTERS

Filed May 27, 1955 15 Sheets-Sheet 8

2,997,563
Patented Aug. 22, 1961

2,997,563

CIRCUIT INTERRUPTERS

Carl C. Smith, Hamilton, Ontario, and Daniel H. McKeough, Burlington, Ontario, Canada, assignors to Canadian Westinghouse Company Limited, Hamilton, Ontario, Canada Filed May 27, 1955, Ser. No. 511,731
18 Claims. (Cl. 200—148)

This invention relates to circuit interrupters in general, and, more particularly, to improved interrupting structures, pneumatic control and lead-in bushings therefor.

A general object of the invention is to provide an improved and more effective circuit interrupting structure than has heretofore been constructed.

Another object of the invention is to provide an improved circuit interrupter of the compressed-gas type, in which the interrupting structure is housed within a tank structure which encloses a suitable arc-extinguishing gas. The gas may be compressed air, or it may be some other suitable arc-extinguishing gas, such as helium, hydrogen, sulfur hexafluoride (the arc-extinguishing characteristics of which are set out and claimed in United States patent application filed July 19, 1951, Serial No. 237,502, now United States Patent 2,757,261, issued July 31, 1956, to Harry J. Lingal, Thomas E. Browne, Jr., and Albert P. Strom), selenium hexafluoride (the arc-extinguishing characteristics of which are set out and claimed in United States patent application filed September 14, 1954, Serial No. 455,976, now United States Patent 2,733,316, issued January 31, 1956, to Thomas E. Browne, Jr., Albert P. Strom, and Harvey E. Spindle), such latter two gases either used alone, or admixed with at least one of the group of inert gases consisting of helium, carbon dioxide, air, nitrogen, and argon.

It is believed that in the past all practical circuit interrupting devices suitable for the interruption of high-power currents have fallen into one of the following three general types:

(*a*) The dead-tank, liquid-filled interrupting device in which the tank is maintained at ground potential, the interrupters and the interrupting medium are contained inside this tank, and the current is led through the tank by means of insulated conductors commonly called bushings. Liquids such as insulating oil or water have been used as an interrupting medium. The motion of the moving contacts of the interrupters has been controlled by means of a mechanical linkage connected through a rod of insulating material to an operating mechanism mounted external to the tank.

(*b*) The live-tank, liquid-filled interrupting device in which the tank is maintained at line potential, the interrupters and the interrupting medium being contained inside the tank, a liquid such as insulating oil being commonly used as the medium. The motion of the moving contacts of the interrupters has been controlled by means of a mechanical linkage connected through a rod of insulating material to an operating mechanism mounted external to the tank at ground potential.

(*c*) The low-pressure-air-insulated gas blast interrupting device where the interrupting medium, which is usually dry air, is contained at relatively high pressure in a tank at ground potential, the interrupters being mounted external to the tank in air at atmospheric pressure and consequently must be insulated from ground by non-conducting material such as porcelain. The motion of the moving contacts in the interrupter may be controlled by a mechanical linkage connected through a rod of insulating material to an operating mechanism mounted at ground potential, or it may be controlled by the displacement of the gas at relatively high pressure through a hollow tube of insulating material which leads from the gas reservoir to the interrupter. A sequential isolating switch electrically connected in series with the interrupter contacts and insulated from the grounded frame of the structure, and operated through a rod of insulating material may be required to isolate the circuit when high pressure gas is not flowing through the interrupter, where the design of the interrupter is such that sufficient gap strength to isolate the circuit is not available when high pressure gas is not flowing.

The disadvantages of the dead-tank, liquid-filled type of circuit interrupting device have been: (1) the interrupting medium used has constituted a hazard in itself—insulating oil is highly inflammable and under certain conditions explosive, while water generates steam when interrupting large currents, causing excessive pressures in the tank, while at the same time having relatively poor insulating strength. The oil also tends to carbonize in service and this lowers its insulating value; (2) the relatively high inertia of the linkage parts tend to cause large inertia forces which lead to extreme complication of the circuit interrupting device.

The disadvantages of the live-tank, liquid-filled interrupting device have been: (1) The interrupting medium has been unsatisfactory in some ways, for instance, when insulating oil is used, the relatively small volume of oil has increased the problem of carbonization; (2) the design of the linkage necessary with the live-tank design has tended to make the device relatively slow to interrupt the circuit; (3) structurally the device has been tall and spindly and subject to mechanical failure due to wind loads, ice loads, and suddenly imposed shock loads, such as earthquake tremors; and (4) it has sometimes been impossible to test the interrupting rating of these devices in the high-power laboratories available because the interrupting units cannot be tested one at a time.

The disadvantages of the low-pressure-air-insulated gas-blast circuit interrupting device have been: (1) Large insulating distances have been required due to the relatively low dielectric strength of air at atmospheric pressure. This has resulted in very tall spindly structures not well suited for the high mechanical forces sometimes imposed. The high pressure gas has been led to the interrupter through an insulating tube of relatively large diameter and uncertain mechanical strength. (2) A relatively long time is required to move the gas up the long tubes required at high voltages. (3) The sequential isolating switch usually used is difficult to operate when it becomes iced up and there is always the hazard of the breaker interrupting, but not isolating, or vice versa whenever the two functions are separated. Mechanical alignment of the isolating switch blade is difficult to maintain. Its use also requires considerable complexity in the way of operating mechanism linkages and valving. (4) A large amount of porcelain or other frangible material is subjected to high pressures and any failure can cause a shrapnel-like explosion in the area. (5) The relatively small volume of the local gas receivers results in a large drop of pressure for each operation of the interrupting device and thus limits the available number of operations severely. (6) The construction of the structure is such that simple ring-type current transformers cannot be used. (7) It is usually necessary to bleed dry gas up the tubes leading to the interrupters to prevent condensation of moisture on their inner surfaces. (8) It has often been necessary to connect the interrupters in series pneumatically with the result that the first interrupter has restricted the flow of the insulating medium to the others, particularly during the arcing period.

Another object of the invention is to provide an improved compressed-gas circuit interrupter which has none of the foregoing disadvantages, and yet is efficient and reliable in operation and easily maintained.

It is believed that all previous gas blast interrupters suitable for the interruption of power currents have fallen into either one of the two following categories: (*a*) those in which the contacts remain open only when a gas of relatively high pressure is flowing through tthe contact gap, (*b*) those in which the contacts remain open when a gas of relatively high pressure is contained at the contact gap by means of a sealed-off valve at both sides of the gap, and remain closed when the gas pressure at the gap is decreased to some lower value. Since the dielectric strength of gases suitable for use in an interrupter is relatively low at low pressures, long gaps are needed to isolate the circuit after interruption.

In the case of (*a*) above, isolation is accomplished by the use of a sequential isolating switch placed in series with the gap and caused to open immediately after circuit interruption but before the high-pressure gas stops flowing at the contact gap, and is held open in that position until the circuit is closed again. In the case of (*b*) above, isolation is accomplished by the relatively short contact gap because of the high dielectric strength of the high-pressure gas superposed between the contacting surface. However, the valve which is placed close to the exhaust side of the gap is subjected to the flow of volatized metallic vapors and arc products at high temperatures and is inherently subjected to scoring of its seating surfaces. Moreover, when the contacts are closed they are separated electrically from the grounded structure of the interrupting device by a gas at relatively low pressure and this necessitates comparatively large distances to insulate from line potential to ground potential. This same problem of relatively long distances to insulate the contacts from ground exists also with the type of interrupter as described in (*a*) above.

Wherever a sequential isolating switch is used attendant problems of a constructional nature exist which carry with them inherent hazards. Some of these difficulties are: (1) it is difficult to align the structure so that the isolator arm always swings into its correct position when closed, (2) wherever interrupting and isolating functions are separated it is always possible to have interruption without isolation or vice versa, in which case a serious failure of the apparatus would occur, (3) icing up of the isolator blade contacts either in the open or in the closed position may prevent it from functioning properly, (4) it is difficult to transmit the force, through a long rod of insulating material, which is necessary to accelerate the isolating arm rapidly enough, particularly when the circuit interrupting device is used for reclosing service.

Another object of the invention is to provide an improved compressed-gas interrupting unit, which will have none of the foregoing disadvantages.

Another object of the invention is to provide an improved bushing construction for a circuit interrupter, in which the construction is such that the current transformer has a minimum internal diameter.

Still another object of the invention is to provide an improved bushing construction in which the bushing may be readily removed without affecting the current transformer.

Another object is to provide an improved terminal bushing construction in which the current transformer may be mounted on the outside of the tank and may be removable from the outside of the tank.

Another object of the invention is to provide an improved contact structure for a circuit interrupter of the fluid-blast type.

Still a further object of the invention is to provide an improved actuating means for the contact structure of a compressed-gas circuit interrupter.

Yet a further object of the invention is to provide an improved mechanical holding means to hold the movable contact in an isolated position in the open-circuit position of the interrupter.

Still a further object of the invention is to provide an improved valve construction for a compressed-gas circuit interrupter.

Yet another object of the invention is to provide an improved exhaust passage which will not be susceptible to breakdown along its axial length.

Still a further object of the invention is to provide an improved insulating supporting structure adaptable for exhausting compressed gas and suitable for supporting an arc-extinguishing unit in which means are provided interiorly thereof to prevent axial breakdown along the supporting structure.

Another object is to provide an improved control for the isolating contact of a circuit interrupter to prevent isolating movement if there has been no fluid blast available for interruption.

Further objects and advantages will readily become apparent upon reading the following specification, taken in conjunction with the drawings in which.

Figure 1:
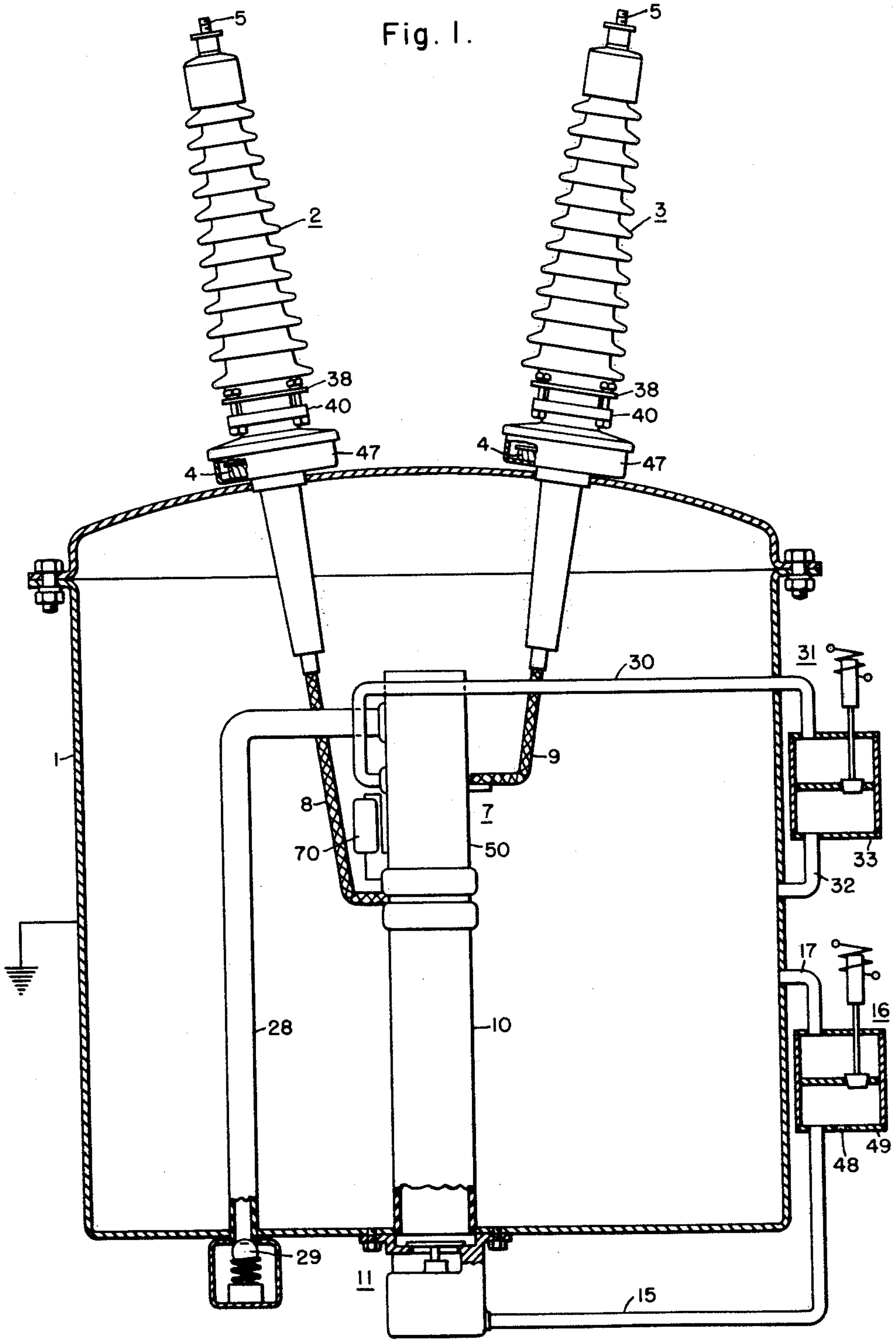
FIGURE 1 is a side elevation view, partially in vertical section, of one form of circuit interrupter embodying the principles of the invention and shown in the closed-circuit position.
Figure 12:
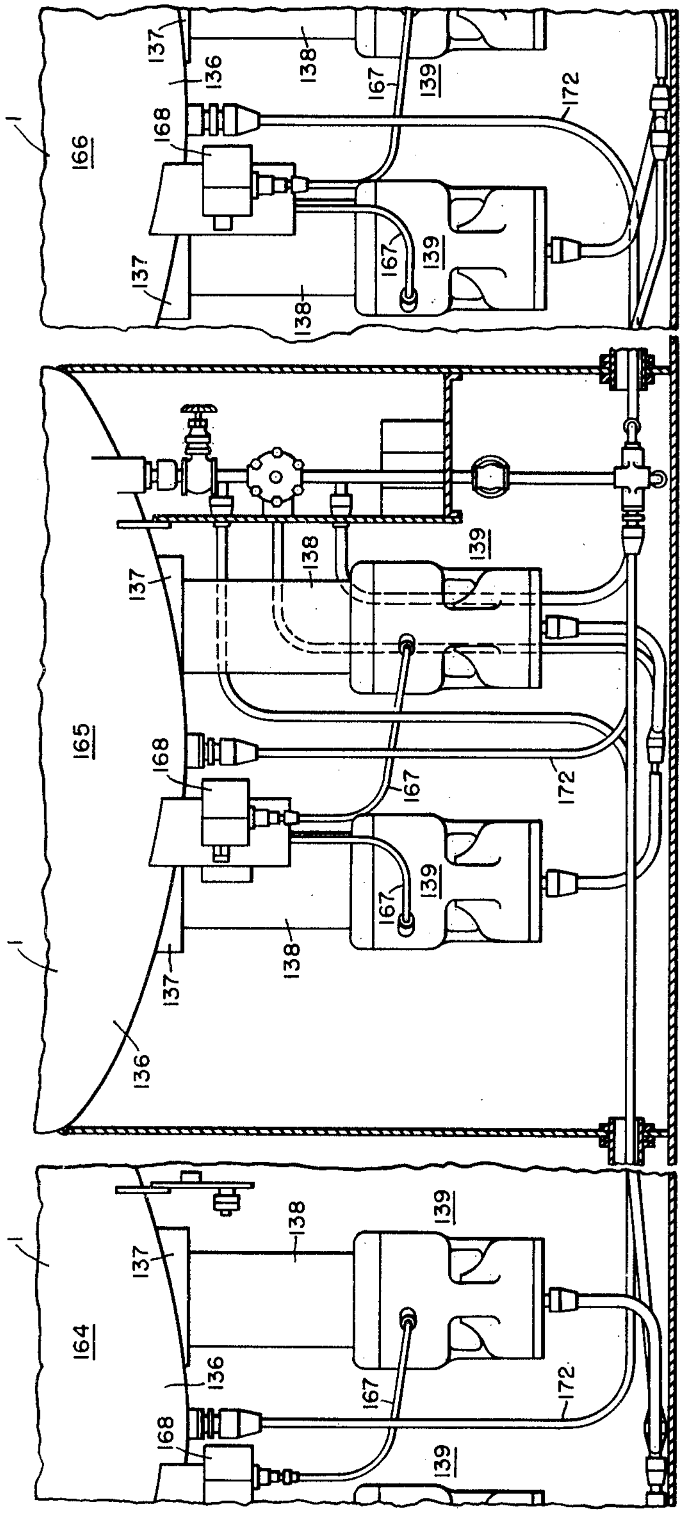
FIG. 12 is a fragmentary side elevational view, partially in section, of a three-pole circuit interrupter embodying arc-extinguishing structures of the type shown in FIG. 11, indicating a pneumatic control therefor.
Figure 13:
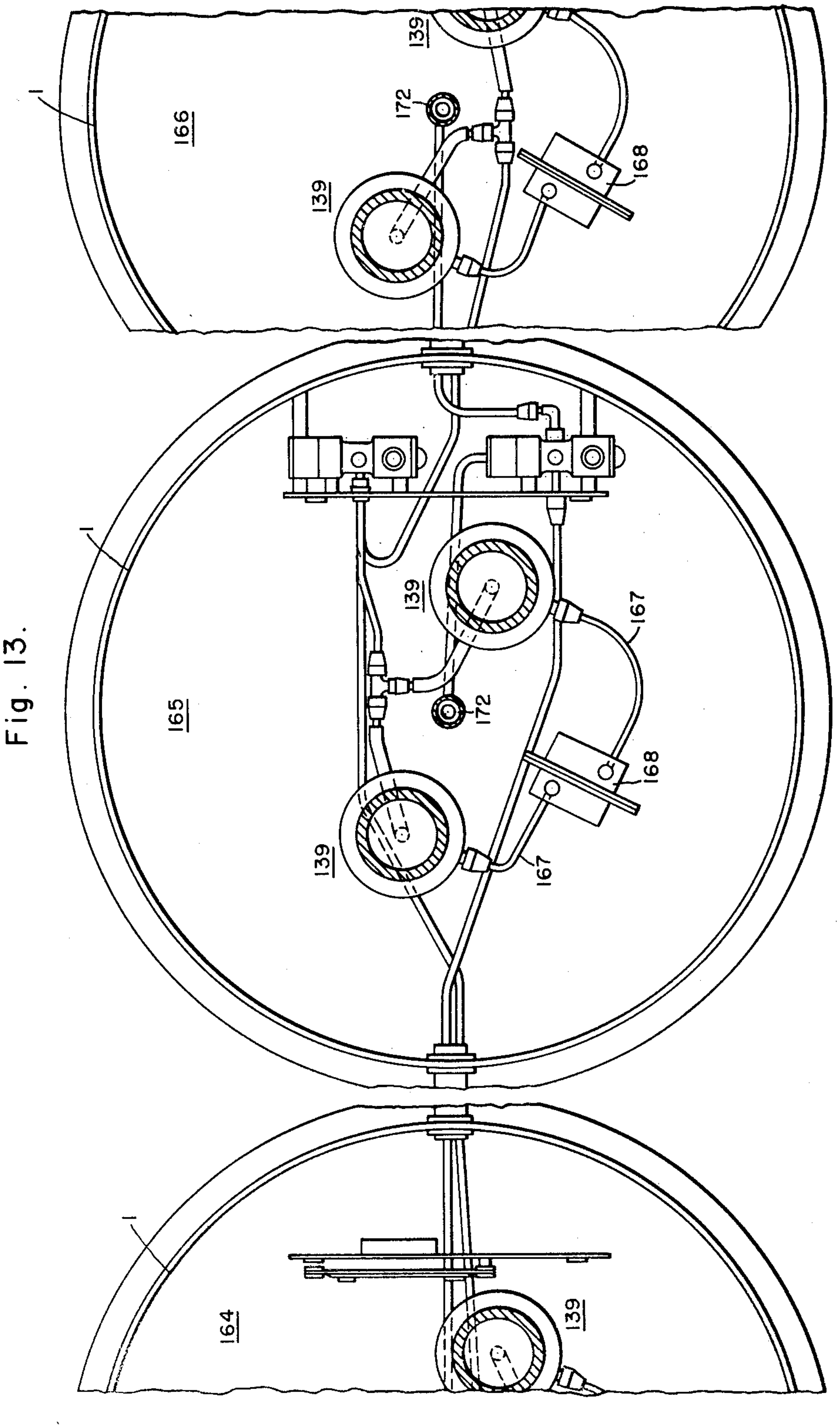
FIG. 13 is a fragmentary plan view of the three-pole circuit interrupter of FIG. 12.
Figure 14A:
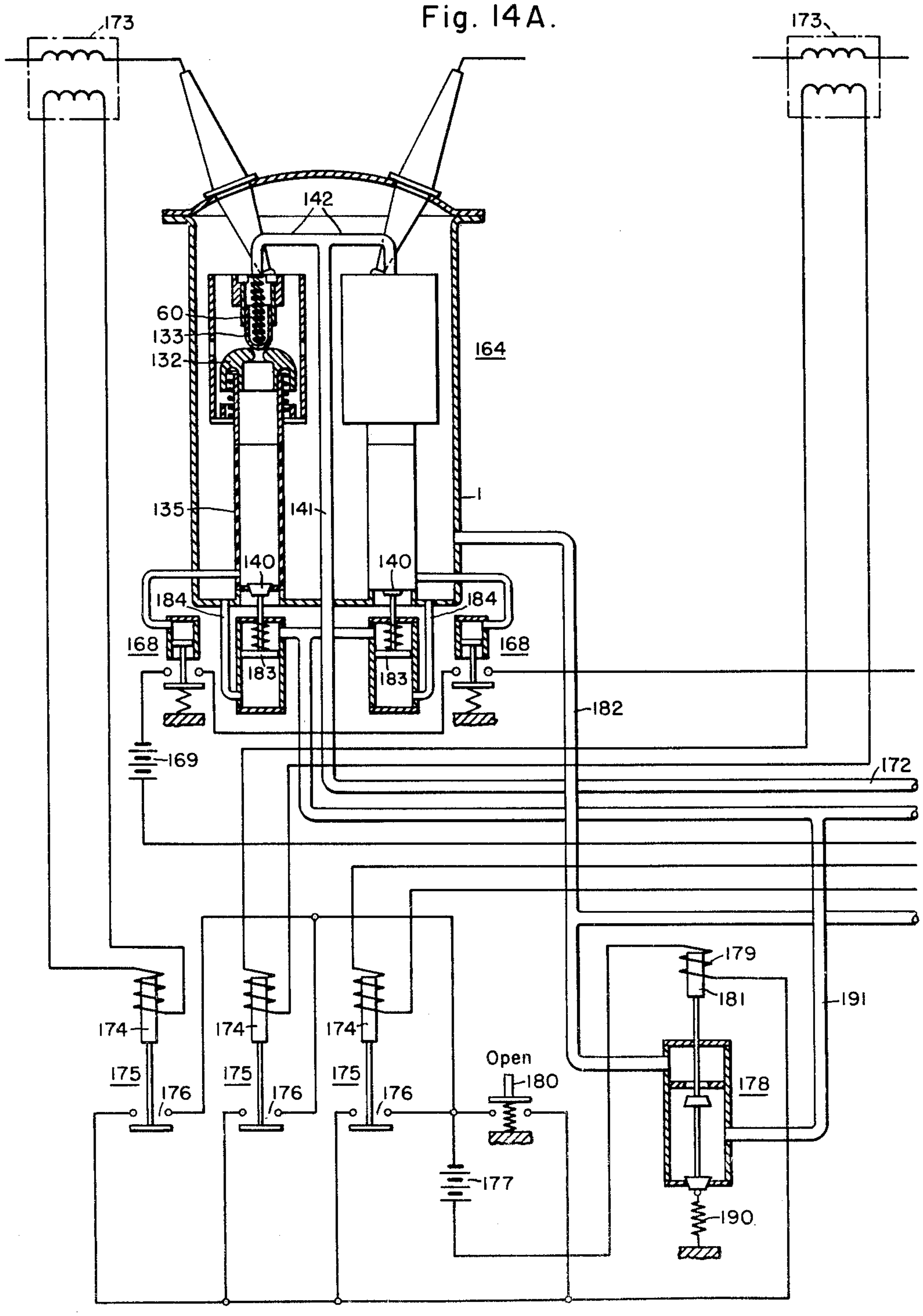
Figure 14B:
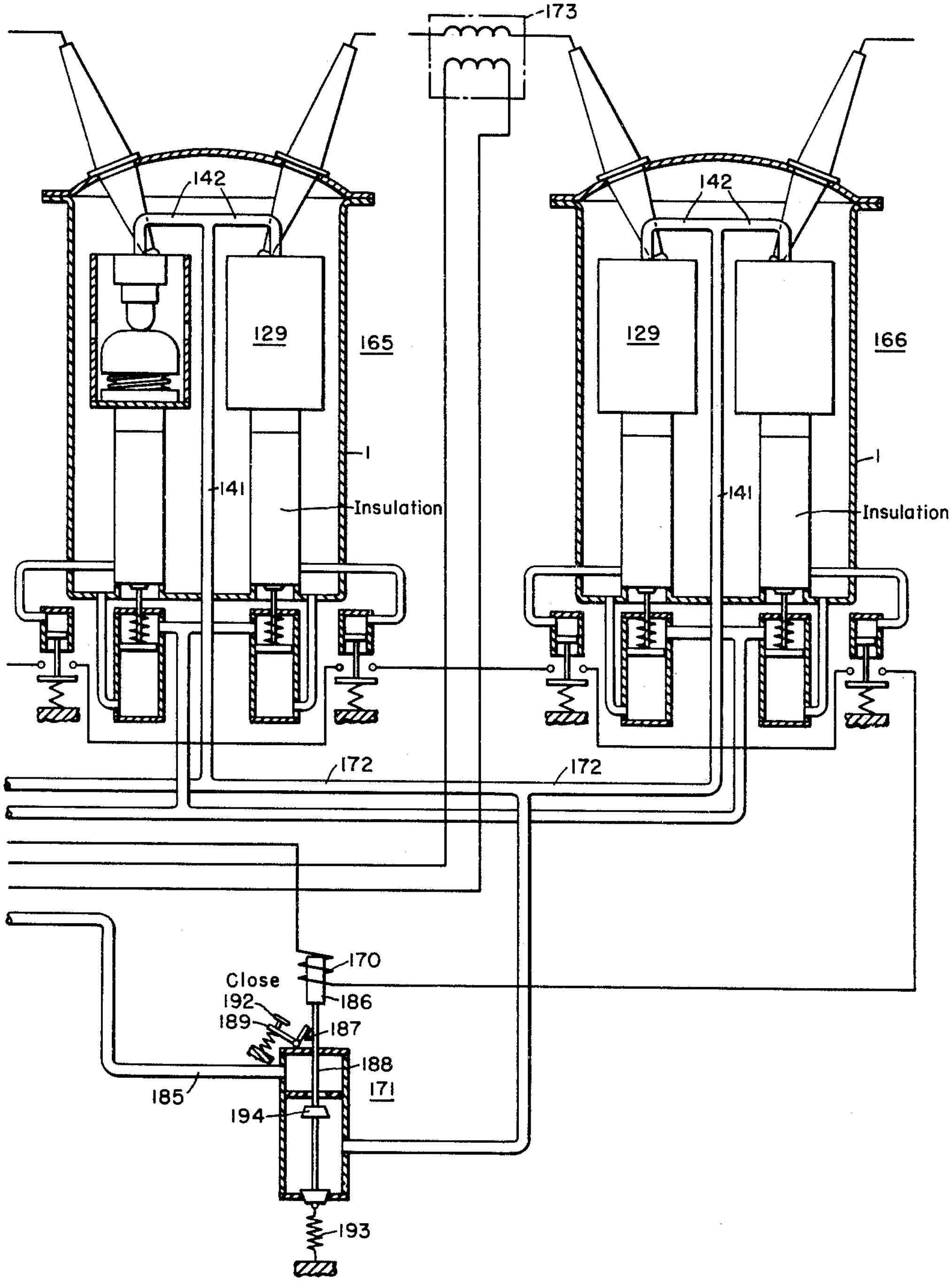
Figure 15:
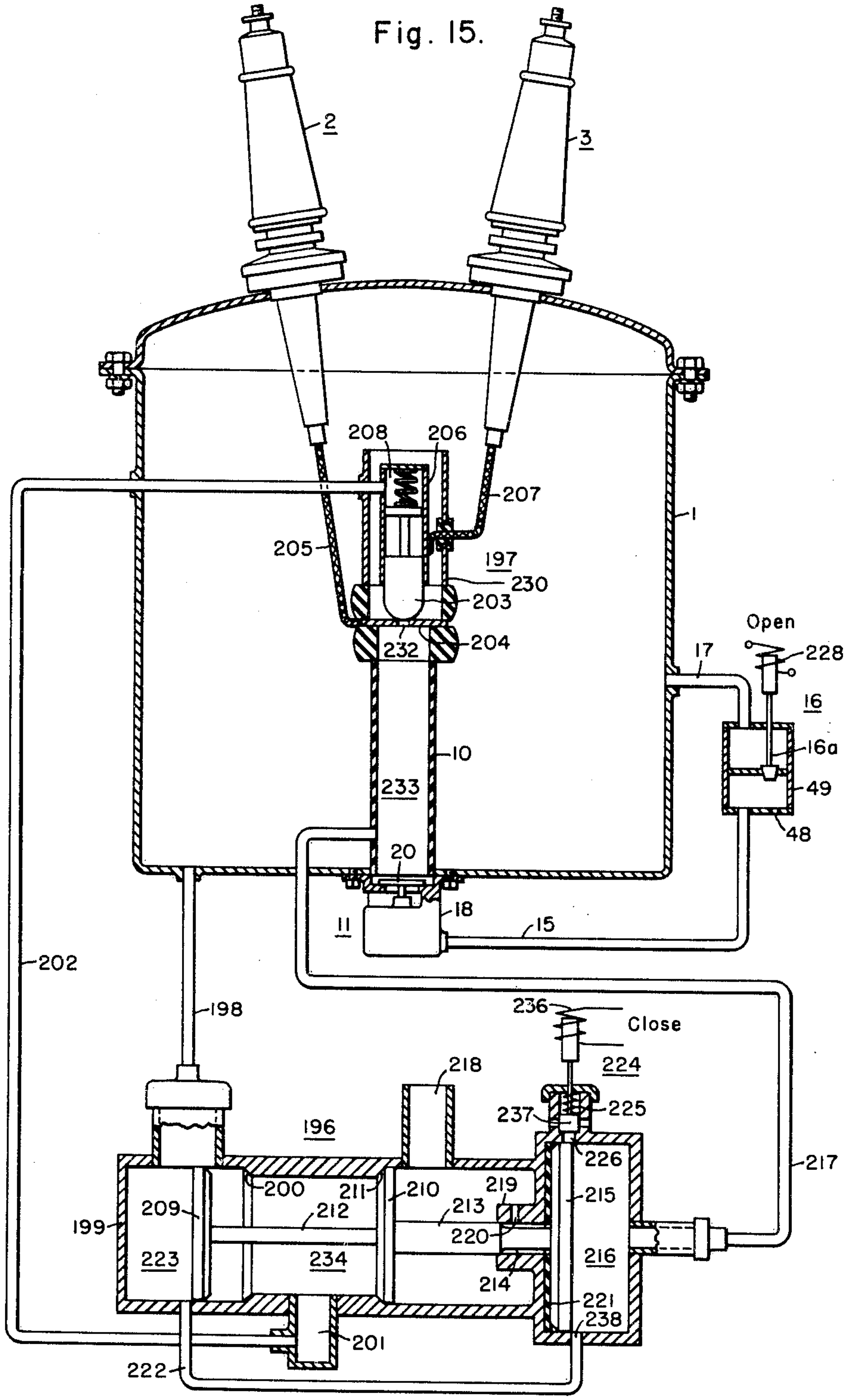
Figure 16:
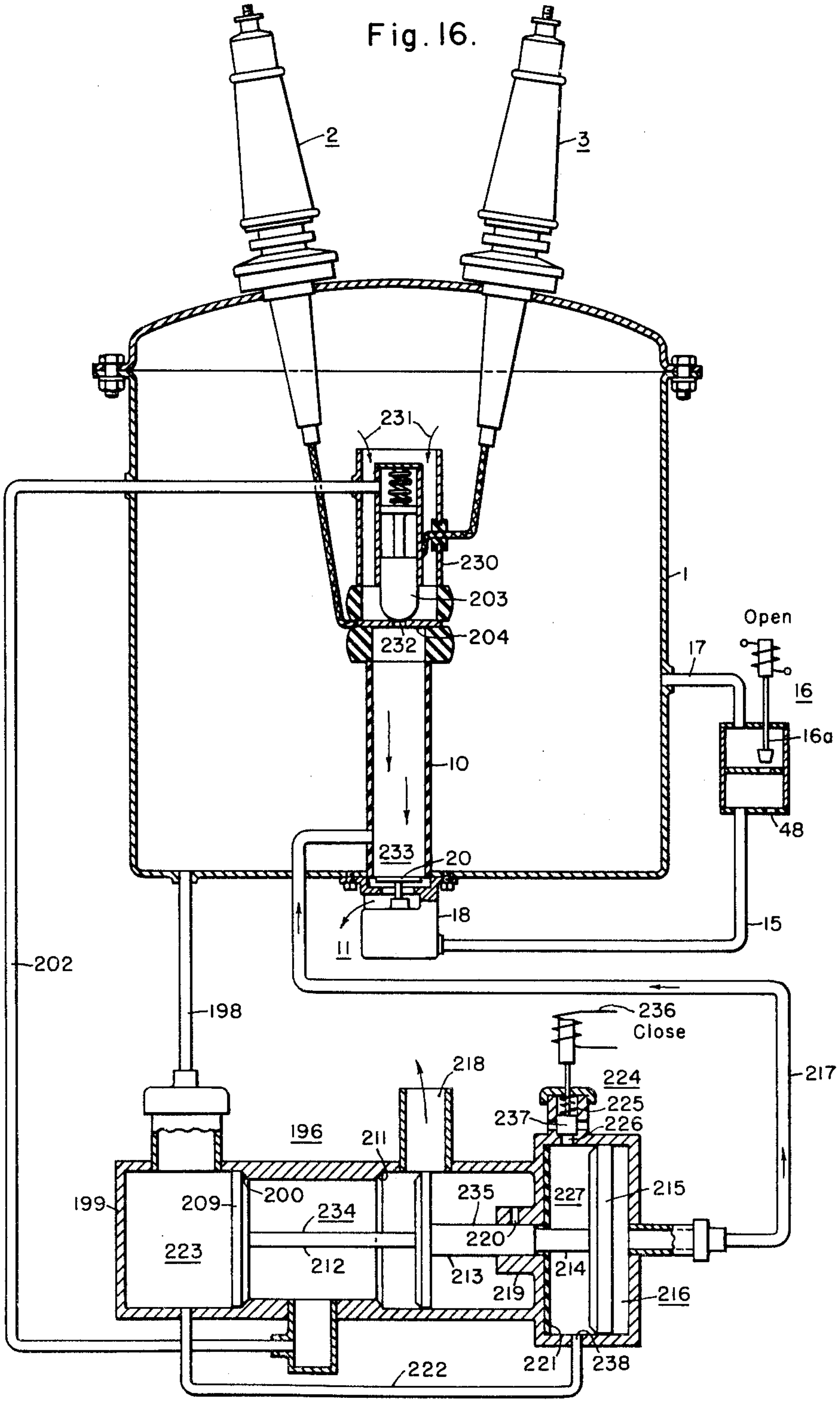

FIGS. 14A and 14B collectively diagrammatically disclose a preferred pneumatic control for the three-pole circuit interrupter of FIGS. 12 and 13, when FIG. 14A is placed to the left of FIG. 14B;

FIG. 15 illustrates a three-way control valve suitable for controlling the movable contact of the arc-extinguishing unit of the general type shown in FIG. 1, the contact structure being indicated in the closed position; and FIG. 16 illustrates the different positions of the several valve parts of FIG. 15 during the initial portion of the opening operation, when the blast valve has been actuated.

Referring to the drawings, and more particularly to FIG. 1 thereof, the reference numeral 1 designates a steel tank so constructed as to contain the interrupting medium, which is of a gaseous nature, at a pressure suitable for the electrical insulation required and also for the efficient interruption of the current. The reference numeral 2 generally designates a terminal bushing suitable for conducting electrical power into the tank 1 and having associated therewith the other terminal bushing 3, so that connections may be made to the external circuit. The terminal bushings 2 and 3 obviously provide suitable insulation between the live parts of the conductor and the tank 1, which is at ground potential. Associated with each terminal bushing 2, 3 is a ring-type current transformer 4. A multiplicity of such current transformers 4 may be mounted around each terminal conductor 5 as conditions warrant and which may be used to provide a secondary source of electrical energy for the control and operation of associated metering and relaying equipment in such a manner that the energy in the secondary source is a function of the current flowing through the circuit interrupting device. The reference numeral 7 generally designates an arc-extinguishing unit, or a gas-blast interrupter, which is so constructed that when its contacts are closed, it permits current to pass from the flexible connector 8 associated with the bottom of the terminal bushing 2 to the flexible connector 9 associated with the lower end of the terminal bushing 3.

As more fully illustrated hereinafter, the movable contact within the interrupter 7 may be rapidly separated from the stationary contact either automatically as external conditions dictate, or at the wish of the operator in such a manner that the current flowing in the external circuit is effectively interrupted. In addition, the interrupter 7 is so constructed that after the contacts are separated they will remain in the open position and will isolate the circuit without the assistance of a sequential isolating switch. Also, the interrupter 7 is so constructed that when its contacts are resting in the open position they may be closed rapidly either automatically as external circuit conditions dictate, or at the wish of the operator in such a manner that the circuit is effectively completed through the interrupter. It should be understood that any one pole of a circuit interrupting device of the invention may either contain a single interrupter 7 or it may contain a multiplicity of interrupters 7 connected in series electrically and in parallel pneumatically.

Figure 6:
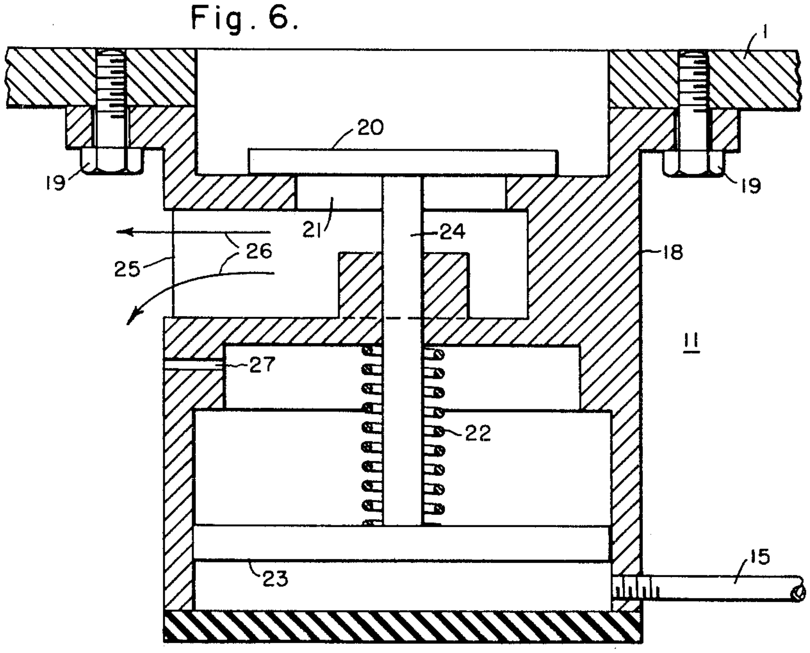
FIG. 6 is an enlarged side elevational view, partially in vertical section, of the blast valve utilized in the circuit interrupter shown in FIG. 1.

An insulating tube 10 is employed to support the interrupter 7 and also to supply a passage for the flow of gas from the inside of the tank 1 through the interrupter 7 and out through the exhausting valve, generally designated by the reference numeral 11, and the internal construction of which is more fully illustrated in FIG. 6 of the drawings. As shown in FIG. 1, the exhausting valve 11 is shown mounted so as to exhaust to atmosphere through the wall of the tank 1. However, as more fully illustrated in FIG. 2 of the drawings, the exhaust valve 11 may exhaust by means of an insulating conduit 12 through tubular conductors 13, associated with modified terminal bushings 2A, 3A, to the region externally of the tank 1. This may have the advantage in certain situations of exhausting hot gases up in the air and away from grounded apparatus.

It is also to be understood that instead of the exhaust valve 11 exhausting to atmosphere, it might exhaust to a reservoir containing gas at some lower pressure. This would be particularly true in the case of employing a relatively expensive gas, such as $SF_6$ or $SeF_6$, which could subsequently be pressurized and fed back into the tank 1 in an obvious manner. However, in the case of compressed air, the exhaust valve 11 may lead to atmosphere, as shown in FIG. 1.

It will be apparent that each pole of the circuit interrupting device may contain either one exhaust valve 11 for each interrupter 7, as shown in FIG. 1, or there may be one exhaust valve 11 for a multiplicity of interrupters 7 associated with the particular pole of the circuit interrupter, in which case the tube 10 could be constructed so as to provide for a parallel gas passage for each interrupter, converging at the exhaust valve 11 to one common outlet.

Figure 3:
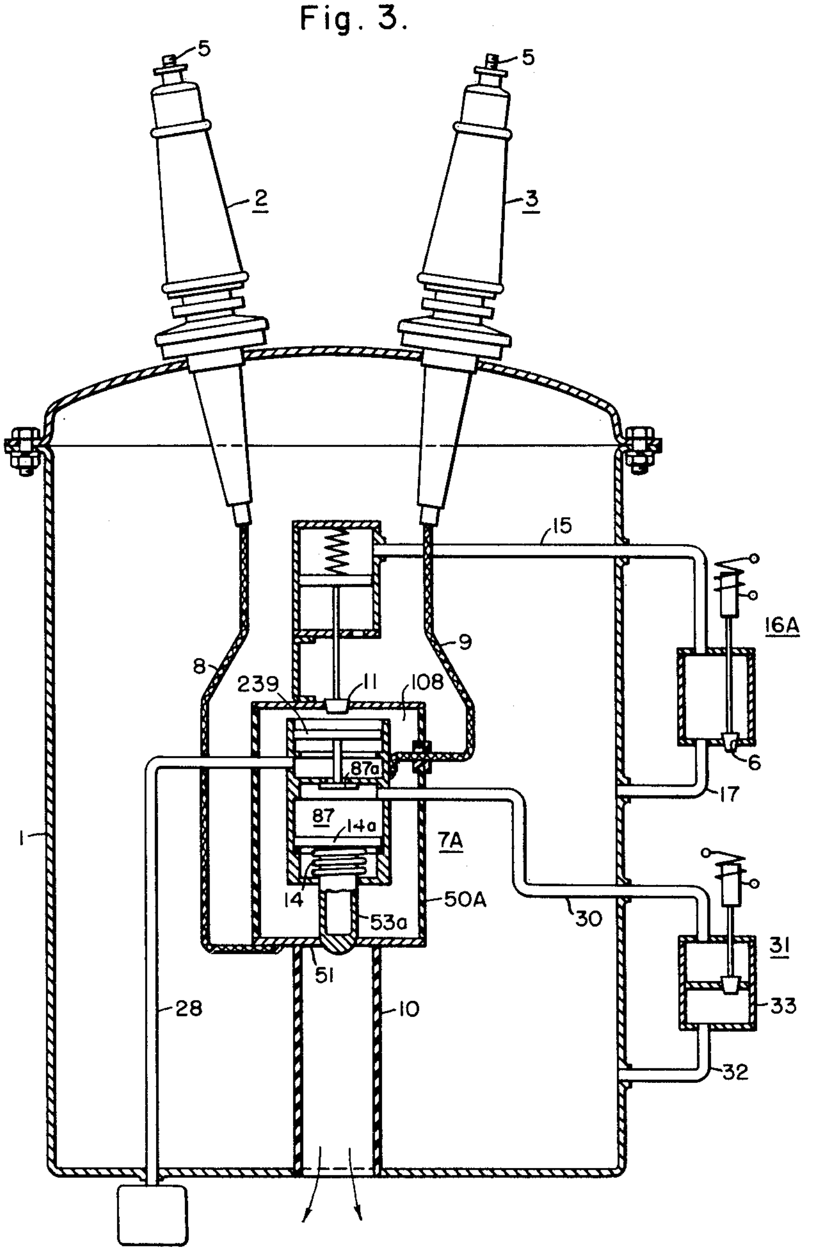
FIG. 3 illustrates diagrammatically still a further modified form of circuit interrupter embodying the principles of the invention, the contact structure being shown in the closed-circuit position.

For certain situations, it may be desirable to position the exhaust valve 11 at the opposite end of the interrupter 7 in the manner diagrammatically illustrated in FIG. 3 of the drawings. In this case, the interior of the modified interrupter 7A would be at atmospheric pressure, and the gas would pass first from the tank 1 through the blast valve 11 and through the modified interrupter 7A to the outlet tube 10.

Referring again to FIG. 1, a hollow tube 15 leads to an electropneumatic control device 16, which is pneumatically connected by a pipe 17 to the interior of the tank 1. The details of the exhaust valve 11 are shown more particularly in FIG. 6 of the drawings. Referring to this figure, it will be noted that the valve body 18 is bolted by mounting bolts 19 to the tank wall 1. A valve 20 closes a port 21 and is spring-biased to the closed position by a compression spring 22. The valve 20 is opened by feeding compressed gas through the conduit 15 to the underside of a piston 23, which forces the valve stem 24 upwardly to open the valve 20. Gas may then exhaust from the tank 1 through the port 21 and out an opening 25 in the manner indicated by the arrows 26. An outlet 27 is provided above the piston 23 so that compressed air will not be trapped above the piston 23.

Referring again to FIG. 1, the reference numeral 28 designates an insulating conduit leading from the interrupter 7 to atmosphere preferably through a ball check valve 29. Where an expensive gas would be employed, the conduit 28 would lead to a low pressure reservoir. An insulating conduit 30 leads from the interrupter 7 to a closing valve, generally designated by the reference numeral 31, and diagrammatically illustrated in FIG. 1. A connection 32 leads from the interior of the tank 1 to the valve body 33 associated with the electropneumatic closing valve 31.

Figures 4, 5:
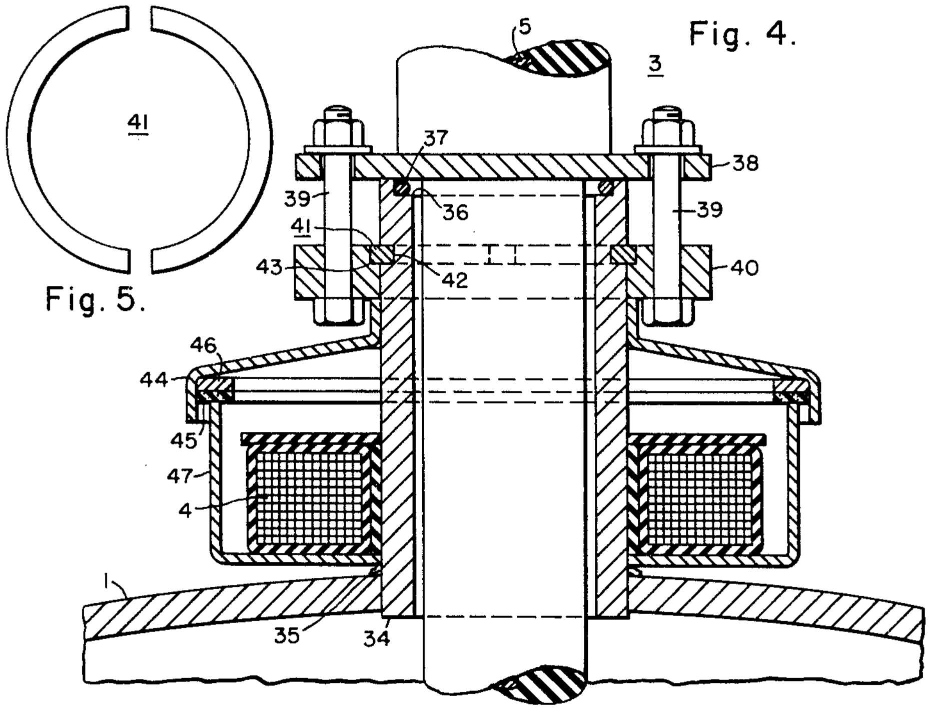
FIG. 4 is a side elevational view, partially in vertical section, of a portion of the bushing structure, with the several parts being enlarged to more fully disclose the construction.
FIG. 5 is a plan view of the split mounting ring construction utilized in the bushing illustrated in FIG. 4.

Referring particularly to the entrance bushings 2 and 3, the construction of which is more clearly shown in FIGS. 4 and 5 of the drawings, it will be noted that a flanged seal is provided by a construction, which comprises an upstanding cylindrical tube 34, preferably secured in a gas-tight connection to the tank wall 1 in any suitable manner, such as by welding 35. The cylindrical member 34 has a machined internal annular recess 36 at its upper end to receive a high pressure sealing gasket 37 of a type well known in the art. This gasket may be of a suitable rubber-like material, which may be readily compressed in a gas-tight manner between the cylindrical member 34 and a mounting flange 38 secured to the terminal bushing 3.

The seal 37 is held compressed by means of mounting bolts 39 suitably disposed circumferentially around the mounting flange 38 of the bushing 3 and extending through a removable flange ring 40, which is positively restrained by a split, or multi-piece removable locking ring 41, more clearly shown in FIG. 5 of the drawings. As shown, the locking ring 41 is set into an annular groove 42 in cylindrical member 34 and extends outwardly into a matching recess 43 in flange ring 40. Attached to flange ring 40 is a spun metal cover 44 so shaped so as to effect a spring bias against an insulating sealing gasket 45 which is disposed immediately below an adaptor ring 46 inserted within the cup-shaped spun metallic cover 44. The gasket 45 rests on the upper edge of a cylindrical, weather-tight current transformer container 47 and effects a suitable weather-tight seal as well as preventing the effect of a short-circuited turn on the current transformer 4. The construction illustrated in FIGS. 4 and 5 permits the bushings 2, 3 to be removed without disturbing the current transformer 4. It also permits the current transformer 4 being kept to a minimum inside diameter, which, in turn, permits the use of current transformers with optimum operating characteristics, and also provides for easy removal of the current transformer 4 if necessary.

To remove the current transformer 4, the gas pressure within tank 1 is reduced to atmospheric. Bolts 39 are removed to allow the flange ring 40 to be depressed, flexing the cover 44 sufficiently to allow the removal of the locking ring 41. Flange ring 40 and bushings 2 or 3 can then be removed, folowing which the current transformer 4 may be removed or interchanged as desired.

Considering the circuit interrupting device in the closed position, as shown in FIG. 1, with a gaseous interrupting medium contained in the tank 1 at relatively high pressure, current enters by way of terminal bushing 2, passes through the flexible connector 8, then through the contacts within the interrupter 7 to the flexible connector 9, and out through the terminal bushing 3, or vice versa in the case of alternating current. The insulation strength of all components inside the tank 1 is such that no undesirable electrical phenomena can occur with the standard potential differences encountered in service or while the apparatus is undergoing tests. The gas within the interrupter 7 and the conduits 10 and 30 is at the same pressure as that inside the main body of the tank 1, while the gas inside the tubes 15 and 28 is at some lower pressure, such as atmospheric.

To open the circuit interrupting device, the opening control valve 16 is energized to permit the gas pressure inside the conduit 15 to rise to that inside the tank 1. Referring to FIG. 6, the gas at relatively high pressure flows through the tube 15 so that the pressure on the underside of the piston 23 is at the same value as that on the top side of the valve face 20. Since the area of piston 23 is much greater than the area of the outlet port 21, the valve snaps upwardly, the gas which is trapped behind piston 23 escaping through the hole 27, so that the gas which is inside the tank 1 can escape through the opening port 25, as indicated by the arrows 26 in FIG. 6.

As more fully described hereinafter, the construction of the interrupter 7 is such that the sudden rush of gas through the interrupter 7 and the tube 10 causes the contacts within the interrupter 7 to separate rapidly in such a manner as to interrupt the current flowing in the external circuit. The function of the conduit 28 is to provide a means of bleeding gas at relatively high pressure from the interrupter 7 to a reservoir containing gas at some lower pressure or to atmosphere, as shown in FIG. 1. The function of the ball check-valve 29 is to keep the end of the tube 28 sealed off from the atmospheric gas except when a gas of relatively high pressure exists in the tube 28. In this way, moisture from the atmosphere cannot condense along the inner wall of the tube 28, which moisture might cause an electrical failure.

The construction of the closing valve 31 is such that gas cannot pass from the tank 1 into the tube 30 unless the closing valve is energized electrically. The electrical control scheme is such that the control valve 16 automatically operates to close off the gas supply to conduit 15 after a fixed period of time, and at the same time to dump the high-pressure gas in conduit 15 to atmosphere, this being accomplished by the relatively small port 48 in the valve casing 49.

Referring to FIG. 6, it will be obvious that upon the dumping of air from beneath the piston 23 by a closing of the opening valve 16, the valve 20 immediately snaps shut under the action of the spring 22 and the gas pressure existing on the top side of valve 20. The gas flow through the interrupter 7 then stops, and, as more fully descripted hereinafter, the contacts in interrupter 7 remain separated by virtue of the constructional features of the interrupter.

To close the circuit interrupting device 7, the closing valve 31 is operated to permit gas from within the tank 1 to flow through the conduit 30 and into the interrupter. As more fully described hereinafter, the construction of the interrupter is such that the gas flow through the conduit 30 forces the contacts closed rapidly so as to establish the circuit from terminal bushing 2 to terminal bushing 3. It should be noted that gas flows through the conduit 28 only when the contacts in the interrupter are moving from one position to the other and not when the contacts are held either in the open or closed positions. It should be noted further that an electrical and/or a pneumatic interlock may be used in the external control circuit so that the control valve 16 cannot be energized at the same time as the control valve 31.

The advantages for the general constructional details of the invention thus far described may be enumerated as follows:

(1) The advantages of a dead tank construction are gained without the use of hazardous liquids.

(2) All openings are completely sealed off to atmosphere eliminating the hazard of moisture contaminating the insulation.

(3) The size of the apparatus is decreased because advantage is taken of the excellent dielectric strength of some gases at high pressures.

(4) A very large local gas receiver is used so that the pressure drop in operation is relatively small.

(5) The interrupting medium at high pressure is stored in and at the interrupter so that no time is lost in transporting the medium to the contacts when the device operates to open the circuit.

(6) The device is ideal for single pole or multi-pole operation.

(7) The use of balancing pipes between different poles assures the same pressure of gas at each interrupter.

(8) No chain of linkage is used to operate the moving contacts.

(9) The device is easy to service and maintain because of the relatively few parts and their accessibility.

(10) Simple ring-type current transformers can be used with no additional equipment.

(11) Simple potential devices can be used with no additional equipment.

(12) Precise alignment of bushings and interrupters within the tank is not required.

(13) The device is simple to test with existing laboratory facilities because each interrupter may be tested as a unit.

(14) The structure is much stronger than that of the existing gas-blast interrupting devices which have their interrupters mounted external to the air receiver.

(15) No sequential isolating switch is required.

The internal construction of the interrupter 7 will now be described. As shown more particularly in FIG. 7, there is provided an insulating tube 50 which forms the body of the interrupter 7, and has fastened to one end an orifice plate 51 of conducting material having an insert 52 of arc-resisting material, which forms a nozzle for the passage of gas. A moving contact 53, having fixed to its end an insert 54 of arc-resisting material, slides inside a thin tube of insulating material material 55, which forms the inner wall of a tube 56 of conducting material. To the upper end of the tube 56 is fixedly secured a valve structure 57 more fully described hereinafter. Fixed to the other end of the tube 56 is a contact assembly which slides against the outer surface of movable contact 53 and is designated by the reference numeral 58. The inner tube 56 is held in position within the outer insulating tube 50 by means of a perforated centering device 59 of conducting material. A compression coil spring 60 bears against the washer 61 of insulating material and tends to hold the contact 53 aganst the orifice plate 51. A Venturi-type passage 62 is formed inside the other end of the tube 50, and a hollow tube 63 is led from its throat to the valve assembly 57. A hollow tube of non-conducting material 30 is led from the valve assembly 57 to the closing electropneumatic control device 31, previously described, which is mounted at ground potential on the frame of the tank 1.

Another hollow tube of insulating material 28 is led from the valve assembly 57 to a low pressure chamber of the circuit interrupting device. Two terminals 66 and 67 are fastened respectively to the centering device 59 and the orifice plate 51. A ring of insulating material 68 is fastened to the tube 50 and holds, in turn, a ring 69 of conducting material, which slides on the moving contact 53. A shunt impedance 70 is connected electrically to the orifice plate 51 and to the ring 69 and is mounted externally to the interrupter 7. A connector 71 electrically joins terminal 66 with contact assembly 58.

The construction of the valve device 57 will now be described. The reference character 72 designates a substantially flat plate having in it numerous holes and openings as a close investigation of the details will disclose. A plate 73 also has numerous holes and recesses. The valve body 74 together with the gasket 75, ring 76, spacers 77 and gasket 78 are all firmly clamped together with plates 72 and 73 by means of bolts 79, as shown.

Figure 7:
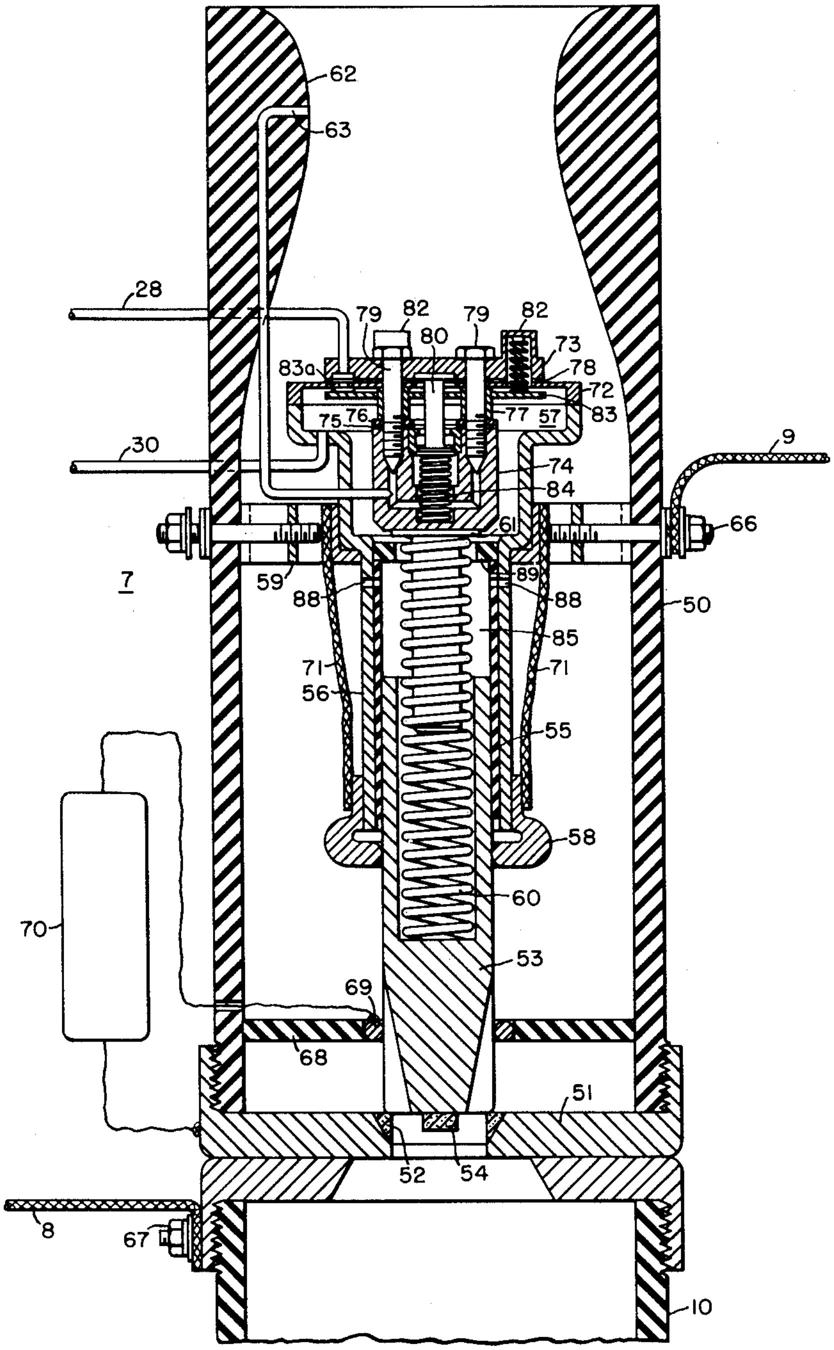
FIG. 7 is a vertical sectional view through the arc-extinguishing unit of the circuit interrupter of FIG. 1, the contact structure being illustrated in the closed-circuit position.

Sliding inside the valve body 74 is a poppet-type valve 80, which in the closed position rests against a seat 81. One or more springs 82 fit inside the disc 73 and tend to hold the valve plate 83 in the open position. The valve plate 83 is made in such a fashion that it can slide back and forth along the spacers 77, and when in the closed position, as shown in FIG. 7, shuts off any flow of gas through the hole in plate 72 and, consequently, through the tube 28. A rubber-like button **83*a* is carried by the plate 83 and closes off conduit 28, as shown in FIG. 7. The tube 63 leads to the region behind the poppet valve 80. A compression spring 84 tends to hold the poppet valve 80** in the closed position.

Considering the interrupter 7 in the closed position, as indicated in FIG. 7 of the drawings, electrical current enters terminal 66 and passes through the several flexible connectors 71 and through the contact assembly 58 to the moving contact 53, to the orifice plate 51, and thence to the terminal 67 to the external circuit, the spring 60 holding the moving contact 53 in intimate contact with orifice plate 51. Pneumatically high pressure gas exists outside and inside the tube 50 and also within the cavity 85 inside the movable contact 53. The valve disc 83 is held against the plate 72 because the tube 28 leads to low pressure and the gas on the other side of plate 72 is at a relatively high pressure. High pressure gas exists on both sides of the poppet-type valve 80, but is held closed by compression spring 84.

As gas is forced to flow through the tube 50 and out through the nozzle 52, as caused by actuation of the exhaust valve 11 in the manner previously described, the static pressure at the Venturi throat 62 drops, following well known laws of fluid mechanics, and, consequently, the pressure in the tube 63 and in the passage 86 also drops. This lifts the valve 80 off its seat 81, drawing with it the valve disc 83 and uncovering the opening in valve plate 72 to the low pressure chamber through the tube 28. Immediately, the pressure inside the cavity 85 of the movable contact 53 and within the tube 56 falls to a lower pressure as the gas escapes through the conduit 28. At the same time, the valve disc 83 is snapped to its fully open position by means of one or more of the springs 82.

Figure 8:
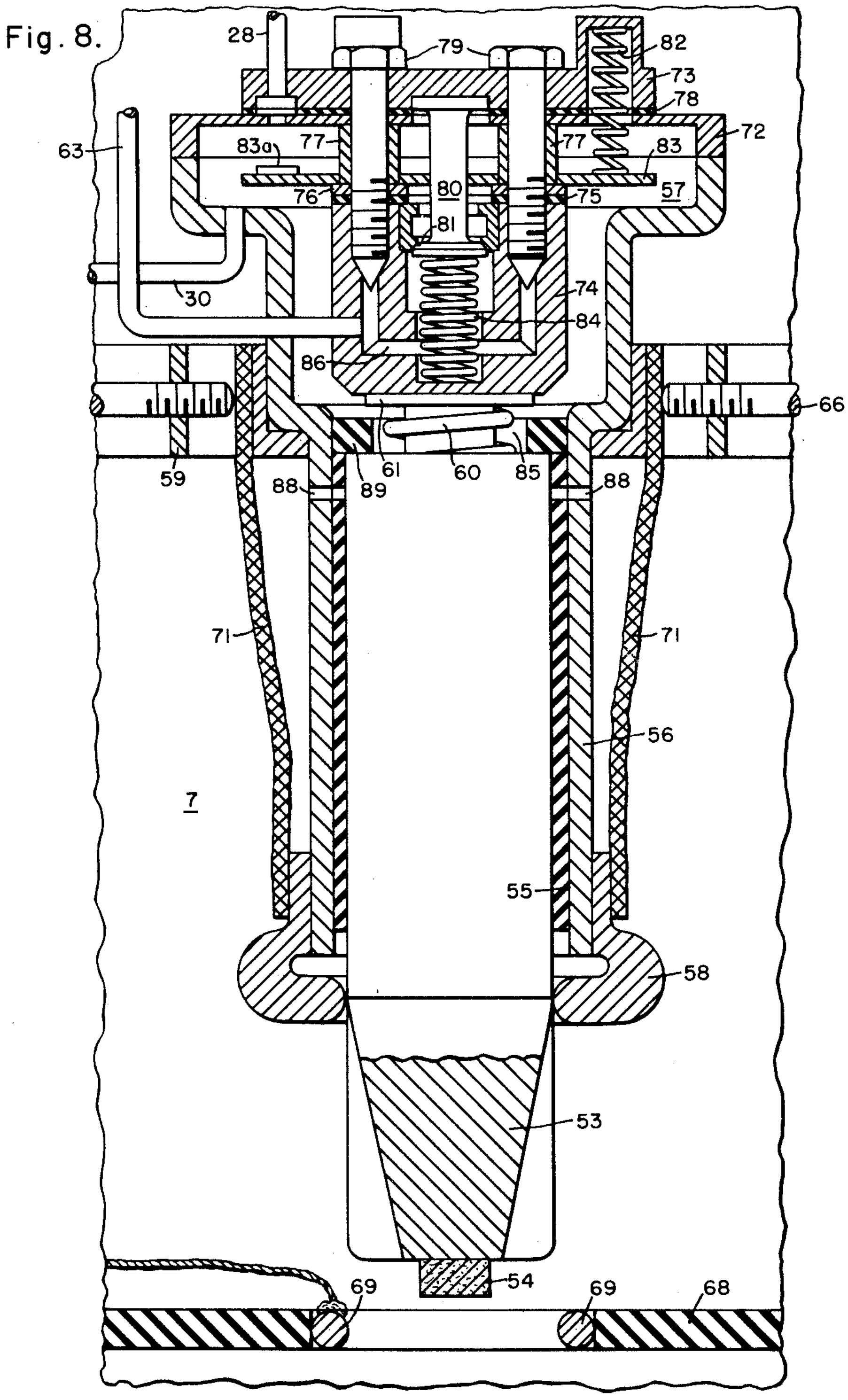
FIG. 8 is a view similar to FIG. 7 but drawn to double scale and showing the contact structure in the open-circuit position.

The conduit 28 and the hole in plate 72 are sufficiently large that any leakage around the movable contact 53 or through the relatively small holes 88 is insufficient to increase the pressure of gas inside the tube 56 appreciably. Consequently, the movable contact 53 is forced to its open position by virtue of the higher gas pressure on its contacting end. As the contact 53 moves away from the arcing ring 52, a power arc is drawn between the two separating surfaces, and the arc is quickly transferred from contact 53 to the arcing tip 54 under the action of electromagnetic forces and the force of the gas flowing through the nozzle 52. At the same time, a relatively small current flows through the impedance device 70. The action of the gas flowing through the arc is such that the power arc is interrupted before movable contact 53 passes completely through the arcing ring 69, the details of construction insuring that this does occur. As the moving contact 53 passes completely through the arcing ring 69, the relatively small shunt impedance current is also interrupted by the flow of gas through the arcing ring 69. The movable contact 53 then continues to move to its fully open position, as shown in FIG. 8, where its upper end comes up against the gasket seal 89. Shortly afterwards as the flow of gas through the insulating casing 50 is stopped by some external means, the gas pressure in the passage 86 rises to the pressure existing outside the interrupter 7, and the valve 80 is held firmly against its seat 81 and any further gas leakage at this point is prevented.

The interrupter is now in the open position with the gap distance between the separated contacts providing the isolating gap. Thus, no external isolating switch is required. The high dielectric strength of the pressurized gas insures that this isolating gap need be only a relatively short distance.

To close the contacts of the interrupter 7, gas of relatively high pressure is introduced into the cavity 85 inside the contact 53 through the tube 30, which leads from the closing electropneumatic device 31. This gas is directed in such a manner that the valve disc 83 snaps shut against the opening to conduit 28, and the gas pressure increases inside the cavity 85 of the movable contact 53 to the same pressure as exists outside the tube 50. As the movable contact 53 moves away from its gasket seat 89, the pressure inside the cavity 85 increases rapidly by virtue of gas leakage around the contact 53 and also through the holes 88. In this way, the compression spring 60 is able to close the movable contact 53 quickly and thus preventing burning at the contact tips due to preignition.

It will be noted that the contacts will remain either positively open or positively closed when a gas of relatively high pressure is contained at the contact gap and will move from either position to the other as external circuit conditions or the wish of the apparatus operator dictate, in such a manner as to interrupt or close the circuit in the most efficient fashion, and will remain in that position. The contact travel to open may be actuated by the momentary drop in pressure at the throat of a Venturi-type passage, which drop is caused by the rapid flow of gas through the passage. Since the gas which is used to interrupt the current must pass through this passage, it would be only necessary to initiate the flow of gas through the interrupter to effect contact separation, and thus no external control would be needed for the operation of the contacts. This eliminates the hazard inherent in some designs of gas blast interrupters in which a malfunction can permit the contacts to separate without gas flowing through the interrupter, which condition can result in a failure of the apparatus. Also, the design of the moving contact and passage around it is such that the gas flow which interrupts the power arc will also interrupt the current flowing through the impedance which may be shunted across the gap which normally sustains the power arc.

The design of the contact and associated details is such that the early part of the contact separation is used to interrupt the power current, which flows in parallel with the shunt impedance current; and the remaining part of the contact travel is used to extinguish the shunt or residual current and to isolate the circuit. Such shunt impedances may be used to divide the voltage equally between different gaps in series in the circuit interrupting device, and also to decrease the severity of service on the interrupter and associated apparatus where circuit conditions warrant it.

Figure 2:
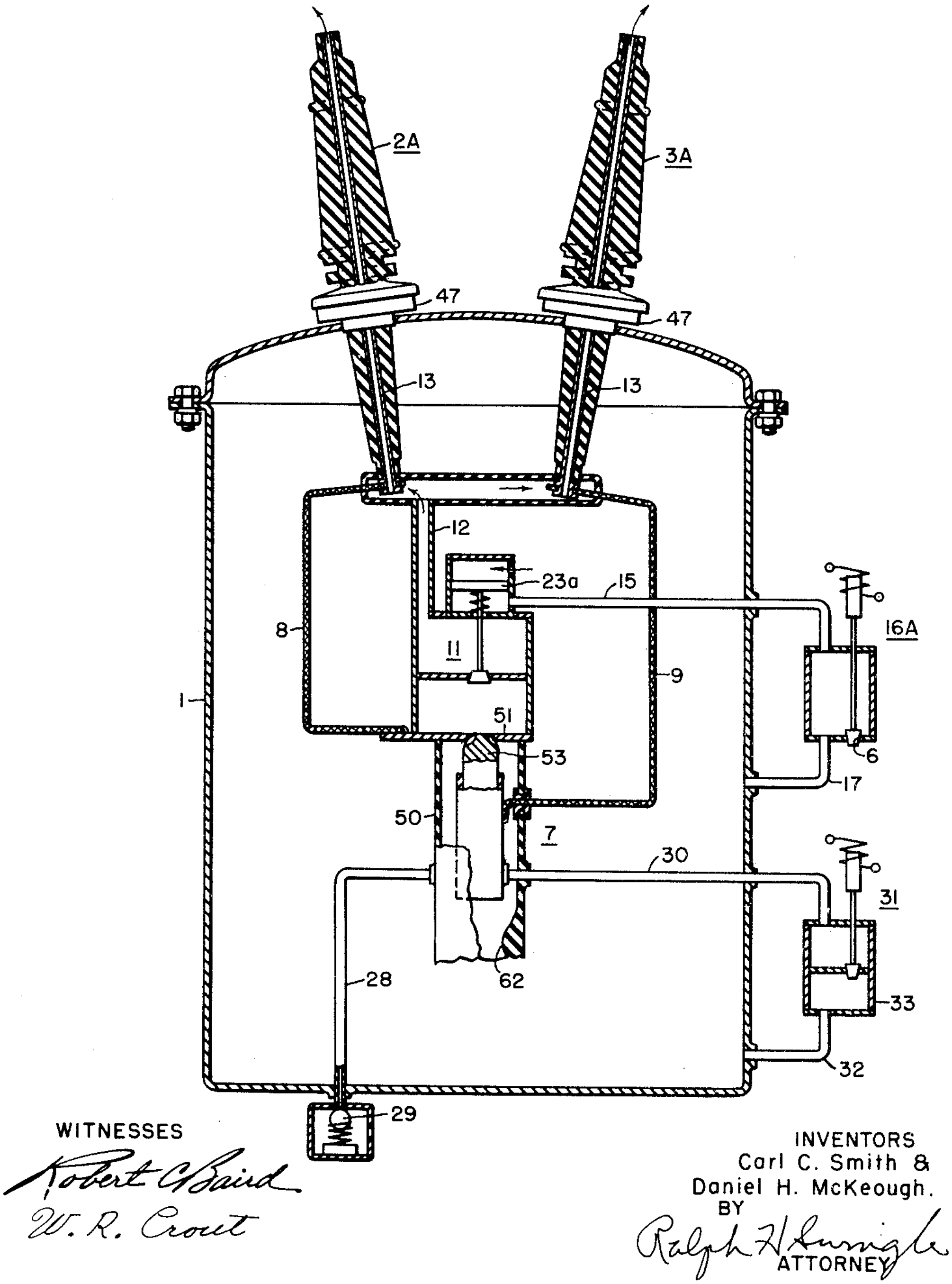
FIG. 2 is a somewhat diagrammatic view of a modified form of circuit interrupter embodying the invention, in which exhausting may take place through the circuit terminal bushings themselves.

In FIG. 2, which illustrated a modified construction for exhausting the arc gases through hollow terminal bushings, a slightly modified opening control valve 16A is employed. As shown, it controls the pressure on the lower side of a spring-biased blast valve piston 23*a*. The port 6 of the opening control valve 16A is much larger than the conduit 17. Thus energization of the opening control valve 16A will open the large port 6 and dump the pressure under blast valve piston 23*a* to permit the high pressure on the top side of the piston 23*a* to effect opening of the blast valve 11. Although somewhat diagrammatically shown, the details of the interrupting unit 7 are the same as heretofore described, with the exception that the impedance 70 is omitted for clarity.

In FIG. 3 the blast valve 11 is controlled in a manner identical to FIG. 2, but since the interior of the casing 50A is at atmospheric pressure in the closed and in the fully open positions, the contact 53*a* must be biased to the open position. A spring 14 does this, and the associated piston 14*a* is sensitive to the pressure within the chamber 87 as controlled by the conduit 30 leading to the two-way closing valve 31.

A piston-operated valve 87*a* controls the venting of the chamber 87 through the vent tube 28. During opening, the blast valve 11 opens to permit pressure to build up in the region 108. This forces the piston 239 down to open the valve 87*a*, thereby venting the region 87 through the vent tube 28, and permitting the spring 14 to open the movable contact 53*a*. The arc drawn between the contacts 51, 53*a* is extinguished by the blast of gas exhausting through the blast tube 10. Subsequently, the blast valve 11 closes, and the contacts 51, 53*a* remain separated by virtue of the spring 14.

To close the interrupter, the closing valve 31 is momentarily energized. This permits high pressure gas to pass through conduits 32, 30 and into chamber 87 thereby closing valve 87*a* and forcing the contact 53*a* to the closed position.

Figure 9:
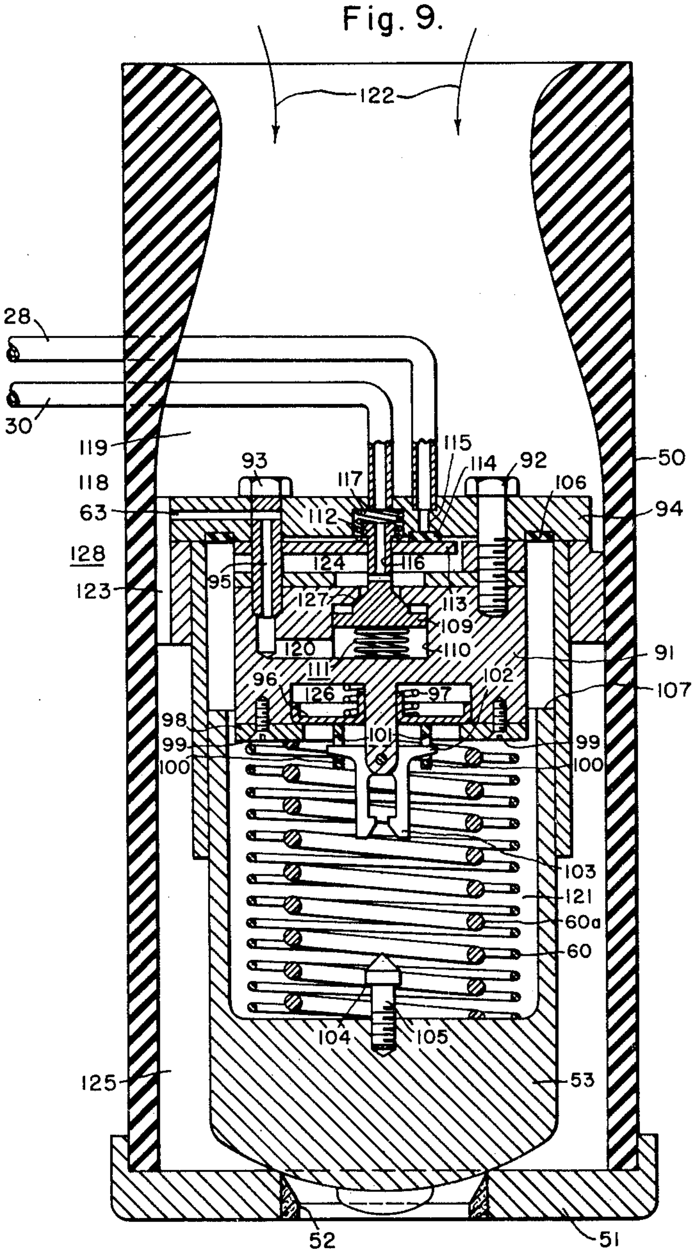
FIG. 9 shows, in enlarged manner, a slightly modified type of gas-blast arc-extinguishing unit, with the contacts shown closed, with an improved mechanical arrangement for holding the movable contact in the open position.

In FIG. 9 there is shown a positive mechanical arrangement to hold the movable contact 53 in the open position regardless of the pressure conditions within the tank 1. Referring particularly to FIG. 9, it will be noted that a casing 50 is provided, having a stationary conducting orifice plate 51 at the lower end thereof, as previously described in FIG. 7 of the drawings. To simplify the drawing the ring plate 68 together with the shunt impedance 70 has been omitted, and there is merely shown in FIG. 9 a pair of separable contacts 51, 53.

Disposed interiorly within the movable contact 53 is valve body 91 secured by bolts 92, 93 to a plate 94 extending partially across the interior of the tube 50. It will be observed that the mounting bolt 93 has a passage 95 provided therein, the purpose for which will become more apparent hereinafter. A piston 96 is disposed interiorly within the valve body 91, being biased by a compression spring 97 in a downward direction, as shown in FIG. 9. The lower limiting position of the piston 96 is determined by a spring base plate 98 secured by screws 99 to the valve body 91.

As shown, the piston 96 has integrally formed therewith a pair of apertured actuating members 100, through the apertures 101 of which extend arms 102 of a pair of bell crank-shaped latches 103. The latches 103 are adapted to engage under a shoulder 104 of a rod end 105 threadedly secured to the inside face of movable contact 53. The spring base plate 98 also serves as a spring base for compression springs 60, 60*a*, whose function is to bias the movable contact 53 toward its closed position against the stationary conducting nozzle plate 51.

Also disposed within the valve body 91 is a ring-shaped rubber-like gasket 106, which provides a seal with the upper end 107 of the piston movable contact 53, when the latter is in its upper open position.

An actuating piston 109 is disposed within a cylindrical cavity 110 within the valve body 91 and is biased to its upward position by a compression spring 111. The actuating piston 109 has a flange portion 112, which is adapted to hook onto a valve plate 113 which is analogous to the valve plate 83 in FIG. 7. This valve plate 113 has a rubber-like button 114 provided on the top surface thereof to control an opening 115 leading through the plate 94 to the conduit 28, the latter, as shown in FIG. 1, leading to a low pressure region.

Also the actuating piston 109 has a passage 116 provided therethrough. In addition, a compression spring 117 is provided to bias the valve plate 113 downwardly to open the opening 115.

In the closed circuit position of the interrupter, as shown in FIG. 9, high pressure exists in the regions 118, outside of the tube 50, 119 within the tube 50 and also within the regions 120 and 121. As described hereinbefore, the blast valve 11 is actuated to exhaust a flow of gas downwardly through the insulating tube 50, as indicated by the arrows 122. Because of the restriction afforded in the passage 123 passing around the plate 94, the pressure is reduced in the same manner that the pressure was reduced in the passage 63 in FIG. 7. This reduction of pressure within the passage 123 is transmitted through the passage 95 in the perforated mounting bolt 93 to the region 120 in back of the actuating piston 109. This causes the piston 109 to snap downwardly, since high pressure exists in the region 124 on its upper face. In moving downwardly, however, the actuating piston 109 hooks onto the valve plate 113 and opens the passage in the conduit 28 to low pressure.

This immediately causes a lowering of the pressure within the region 124, which also lowers the pressure within the region 121. The compression spring 111 returns the actuating piston 109 to its upper position, as shown in FIG. 9, since a decrease of pressure is now present on both of its faces. The compression spring 117, however, maintains the valve plate 113 in its lower position, thus maintaining the opening 115 unobstructed. Since the high pressure within the contact 53 is released through the low pressure conduit 28, the high pressure along the passage 125 causes the movable contact 53 to move upwardly causing a separation between the contacts 51 and 53.

The movable contact 53 moves upwardly until its upper edge 107 engages the gasket 106, thereby maintaining the reduced pressure within the region 121, and the latches 103 hook under the rod 105 thereby mechanically latching the movable contact 53 in its upward open position.

The arc which was drawn between the movable contact 53 and the stationary contact 51 is extinguished by the blast of gas passing downwardly through the orifice 52, and after a predetermined time the blast valve 11 recloses so that high pressure equalizes throughout the insulating tube 50. However, because the valve plate 113 is in its lower position thereby rendering the opening 115 unsealed, low pressure continues to exist within the regions 124, 121 and leakage past the piston 96 causes low pressure to also exist within the region 126 on the upper or back face of the piston 96. High pressure, however, is maintained through the passage 63, passage 95 and region 120 on the lower side of the actuating piston 109, but because of the valve sealing surface 127 this high pressure is prevented from communicating with the region 124. The high pressure within the region 120 plus the biasing action exerted by the spring 111 insures that the piston 109 is maintained in its upper position, as shown in FIG. 9, maintaining the seal at 127.

It will be observed that should the pressure within the tank for any reason be lowered the mechanical latches 103 will maintain the movable contact 53 in its upward open position. Moreover, even if the pressure is maintained high within the tank, and should there be a loose seal between the gasket 106 and the upper end 107 of the movable contact 53, this seepage of high pressure gas within the region 121 will not effect actuation of the latches 103, because of the slight leakage around the piston 96. Thus, there is shown an arrangement which mechanically maintains the movable contact 53 open regardless of pressure conditions within the tank 1 and also regardless of whether there is a tight seal between the gasket 106 and the upper edge 107 of the movable contact 53.

To effect the closing of the extinguishing unit 128, high-pressure gas passes throuh the conduit 30 in response to actuation of the closing valve 31, as illustrated in FIG. 1. This high-pressure gas passes through the passage 116 provided in the actuating piston 109 and rapidly increases the pressure within the regions 124 and 121. This sudden increase of pressure snaps the valve plate 113 closed over the opening 115 against the slight biasing action exerted by the compression spring 112. Since the pressure rapidly rises with the region 121, the slight leakage past the piston 96 is not sufficient to prevent the high pressure within the region 121 from forcing the actuating piston 96 upwardly to effect release of the latches 103. The rod end 104 hence is released and the compression springs 60, 60*a* quickly force the movable contact 53 downwardly making engagement between the contacts 52, 53, thereby closing the circuit. Thus, it is seen that this mechanical arrangement provides a workable means to positively hold the movable contact open regardless of pressure conditions within the tank 1, yet permits the openable contact 53 to be closed at any desired time without complicating the closing means.

FIGS. 10–13, 14A and 14B illustrate a further embodiment of the invention, which is applied to a three-pole circuit interrupter, as illustrated in FIGS. 12, 13, 14A and 14B. The casing 1 is generally the same as the casing 1 of FIG. 1, being filled with a suitable arc-extinguishing gas under pressure. The terminal bushings 2, 3 may be the same as those described in FIGS. 4 and 5. However, it will be observed that in place of a single interrupting unit 7, as was utilized in FIG. 1, in the present embodiment of the invention there are utilized two arc-extinguishing units, generally designated by the reference numeral 129, and connected in serial relation. In other words, generally the electrical circuit through each of the three poles extends downwardly through the terminal bushing 2 through a flexible conductor 130, not shown on the left in FIG. 10, to an orifice support 131 (FIG. 11) to a relatively movable orifice contact 132, to the movable contact 133, through a conductor 134 to the movable contact 133 of the other interrupting unit 129, and thence through the orifice contact 132 and the orifice support 131 therefor to the other flexible conductor 130. The circuit then extends through the other terminal bushing 3 of the device.

Figure 10:
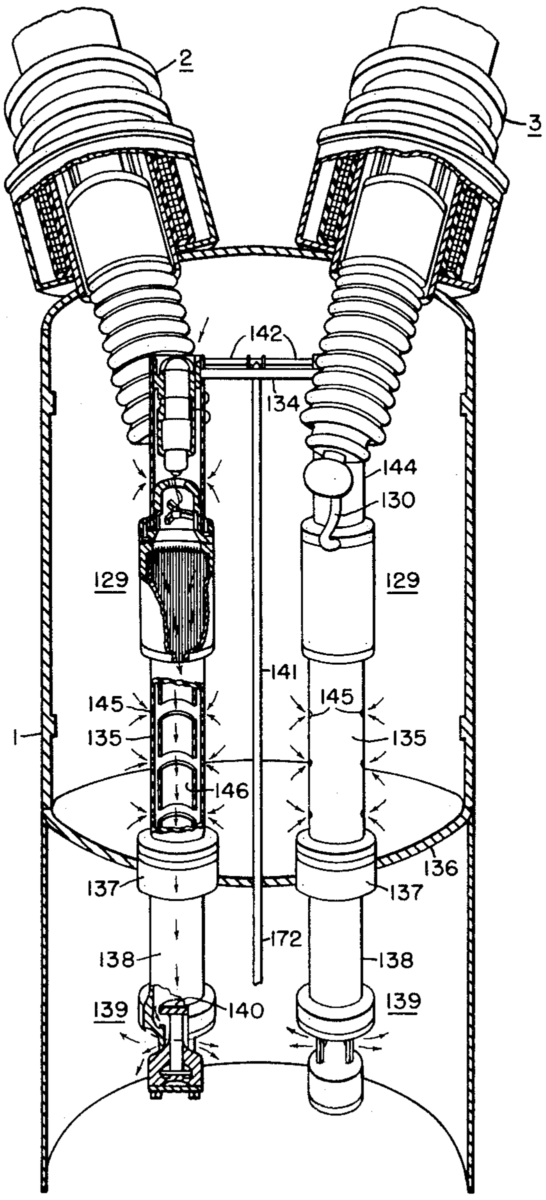
FIG. 10 is a side elevational view, in perspective, with parts shown in vertical section, of a modified type of circuit interrupter embodying the principles of the invention, and shown in the partially open-circuit position.

As observed in FIG. 10, each of the arc-rupturing units 129 is fixedly supported by an insulating perforated blast tube 135, which extends downwardly through the base 136 of the tank 1 in a gas-tight seal, using any suitable flanged air or gas seal 137 and has an external portion 138, at the lower end of which is positioned an exhaust valve or a blast valve, generally designated by the reference numeral 139.

In the closed circuit position of the interrupter, as indicated in FIGS. 14A and 14B, compressed gas exists within the tank 1, throughout the interior of the interrupting units 129, within the internal portions of the blast tube 135 and down to the valves 140, associated with the blast valves 139. There is also present compressed gas within the conduit 141, which extends upwardly through the bottom 136 of the tank 1 and has at its upper end two branch conduits 142, which lead to the back sides of the movable piston contacts 133, in a manner more clearly shown in FIG. 11 of the drawings.

To effect the opening of the circuit interrupter, suitable means, hereinafter fully described, are employed to open the blast valves 140 associated with the exhaust valves 139 as shown in FIG. 10. This will permit gas from the interior of the casing 1 to pass downwardly through the upper end 143 of the insulating tube 144 against the relatively movable orifice contact 132, causing downward movement of the same and thereby establishing an arc between the contacts 132, 133. Compressed gas will also pass into the blast tube 135 through a plurality of apertures 145 which are located between a plurality of insulating guard cylinders 146, which serve to protect the internal surface of the blast tubes 135 from a conducting coating of metallic arc products, which would tend to reduce its insulating qualities.

It is to be noted that during the initial downward movement of the relatively movable orifice contact 132, the movable contact 133 remains stationary, the latter preferably only providing an isolating movement, following arc-extinction.

Figure 11:
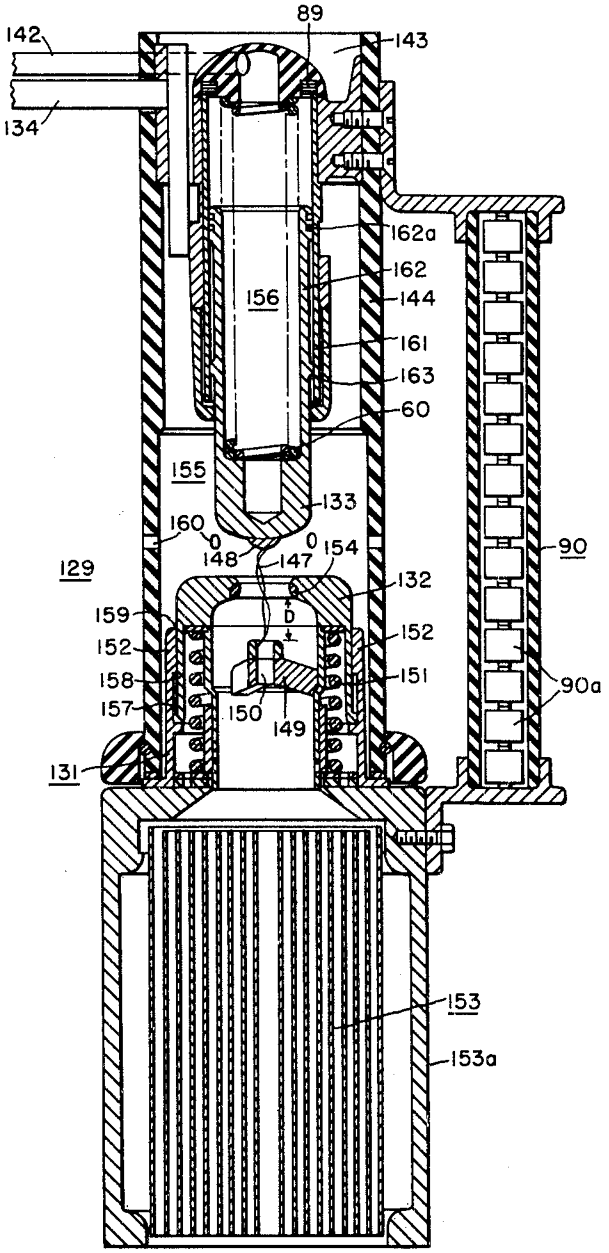
FIG. 11 is an enlarged vertical sectional view taken through the modified gas-blast interrupting unit of FIG. 10, the contact structure being shown in the partially open-circuit position.

With particular reference to FIG. 11 of the drawings, which shows the state of affairs following downward movement of the orifice contact 132 and prior to any upward isolating movement of the movable contact 133, it will be observed that the established arc 147 has been carried by the gas blast so that its upper end terminates on an arc-resisting button contact 148, whereas the lower end of the arc 147 is centered at an arc-centering contact 149, which has a blast passage 150 extending therethrough. A compression spring 151 tends to bias the orifice contact 132 upwardly against the movable isolating contact 133. Bearing upon the outside surface of the orifice contact 132 is a plurality of contact fingers 152, which are secured to the orifice support 131. A cooler 153, preferably formed by rolling up a wire screen of any suitable metallic material into a cylinder, is employed to cool the arc products and to muffle the explosive noise produced by the breaker, but providing the least possible air resistance.

Following extinction of the arc 147 by the gas blast passing through the orifice 154 of the orifice contact 132, suitable means, hereinafter described, causes an exhausting of the gas pressure from within the conduits 141, 142 to reduce the pressure in back of the piston contacts 133. Because high-pressure gas exists in the region 155 internally of the insulating tube 144, the movable isolating contact 133 will be moved upwardly against the biasing action exerted by a compression spring 60 so that the upper end thereof seats against a gasket 89. During the time that the interrupter is open the movable isolating contact 133 remains in its upper position, the pressure within the region 156 therein being low as provided by the low pressure in the conduits 141 and 142. In the open-circuit position of the interrupter, blast valves 140 are caused to close, thereby permitting the compression spring 151 to return the orifice contact 132 to its upper position, as determined by a flange 157 associated with a sleeve portion 158 striking against an internally disposed flange portion 159 of the segmental contact fingers 152. As mentioned, however, this does not close the gap between the contacts 132, 133 since the latter contact is maintained in its upward, separated, raised, isolating position until such time as it is desired to effect reclosure of the interrupter.

It will be observed that there are provided a plurality of apertures 160 through the side walls of the insulating cylinder 144; this permits additional gas to flow into the region 155 during arc extinction. Also, it will be observed that there is a relatively fixed distance "D" between the orifice 154 and the upper end of the arc centering contact 149 so that the arc will be disposed within a region of maximum intensity of gas. As before, the purpose of the gasket 89 is to prevent air leakage from within the upper tube 161 around the piston 162 and out through the control air line 142. In operation, it is intended that the arc shall be extinguished in the time interval between the first downward movement of the orifice contact 132 and the initial upward movement of the movable isolating contact 133. It is not intended that the interruption of the arc shall be dependent upon the movement of the upper contact 133, but merely that the upper contact 133 shall be moved sufficiently to produce an isolating gap.

The purpose of the arc-centering contact 149 is to insure that the arc 147 is centralized within the orifice 154, thus assisting in the extinction of the arc 147, which is choked off by the flow of high-pressure gas to the orifice. The gas inlets 160, being exposed to the high pressure of the tank 1, permit gas to flow in around the contact 132, 133, assisting in the cooling of the contact and also assisting in introducing more air or gas to the ionized area, thus reducing the chance of continued arcing. The arc products produced during interruption are blown down through the cooler 153, which, as mentioned, comprises a metallic wire screen rolled up in a cylinder and placed with a cooler casing 153*a*. This metallic material absorbs large quantities of heat from the arc products and also serves to muffle the explosive noise produced by the breaker. It is obvious, of course, that this cooler 153 should be formed in such a manner as to introduce the least possible air resistance, while at the same time serving its purpose satisfactorily.

The blast products after moving through the cooler 153 thereof move downwardly through the blast tube 135 and out through the blast valve 139 into the atmosphere. It will be noted that the blast tube 135 is made of an insulating material, since there is a high potential difference between the interrupting units 129 and the bottom 136 of the casing 1. In order to produce a seal between the blast tube 135 and the casing 1, a flanged air seal 137 is used.

During the operation of the breaker it is possible that arc products may cause a deposit on the internal walls of the blast tube 135, thus reducing its insulating qualities. To obviate this possibility, exhaust shields 146, which are simply angular sections of diameters slightly less than the blast tube 135, are mounted at intervals down the blast tube 135 with suitable gaps between them. At these gaps holes 145 are placed in the blast tube 135. In operation, any blast products which would normally be deposited on the inner walls of the blast tube 135 are deposited upon the exhaust or guard shields 146, and due to the gaps between the exhaust shields 146, the insulating quality of the blast tube 135 is maintained. To obviate the possibility of the arc products depositing on the blast tube 135 in the intervals between the exhaust shields 146, apertures 145 are provided, which permit high-pressure gas to flow in from the breaker tank 1 scavenging the area between adjacent exhaust shields 146 and maintaining a high dielectric strength in this area. These apertures 145 also have the advantage of cooling the gas and reducing its effect upon the blast valves 140 associated with the exhaust valve structures 139.

When it is desired to reclose the breaker, it is merely necessary to introduce high-pressure air to the contact air line 141. The pressures on both sides of the moving contact piston 133 will then become equal, and this permits the upper contact biasing spring 60 to force the upper contact 133 down against the orifice contact 132. The blast valve is not opened during the closing operation, since it was felt that since the closing takes place in a high-pressure atmosphere, pre-ignition would not be encountered. The piston sealing rings 162*a* perform their obvious function of prohibiting excessive leakage of air past the piston 162, and the guide ring 163 insures the proper alignment of the piston 162 within the cylinder 161.

Impedance means 90, in this particular instance comprising a plurality of serially related capacitance elements 90*a*, shunt each interrupting unit 129. This assists in dividing the voltage equally across each interrupter 129 when two such units are in series, as shown in FIG. 10. The impedance of the assembled shunt is so high that when the interrupter contacts are open, the current through the shunt 90 is practically zero.

An important feature of the invention is a construction whereby the movable isolating contact 133 does not perform its isolating movement unless there has been present within the particular interrupting unit 129 associated with said isolating contact 133 an interrupting blast of gas. In other words, it is desired to guard against the possibility of raising the isolating contact 133 if the blast valve has become stuck, or has failed to operate. It is obvious that should the blast valve 139 fail to operate there would be no blast of gas present, and the raising of the isolating contact 133 with no gas blast present would cause a burning of the contacts 132, 133 in the absence of such a blast.

The construction, which will be described hereinafter, prevents the foregoing possibility insuring that the isolating contact 133 will not perform its isolating movement unless, and only unless, its particular blast valve has functioned to cause a blast of gas requisite for arc extinction.

Referring particularly to FIGS. 12 and 13, it will be observed that there are fragmentarily shown three pole units 164, 165, 166 associated with a three-phase circuit breaker installation. In FIG. 12, only the lower portions of the tank structures 1 are illustrated. It will be observed that the exterior portion 138 of the blast tubes 135 are shown together with portions of the air flange seals 137. Associated with each of the two exhaust valve structures 139 for each pole of the interrupter is a rubber tube 167, which initiates a pressure actuated switch 168 whose conductive condition is dependent upon the operation of the blast valves. As more clearly shown in FIGS. 14A and 14B, the pressure switches 168 are all connected in series, and only upon the operation of all six blast valves 139 do the pressure switches 168 complete a circuit from a battery 169 to the solenoid 170 of a three-way valve 171, which effects isolating movement of all the six movable isolating contacts 133.

As diagrammatically illustrated in FIGS. 14A and 14B, the three-way valve 171 has a pneumatic connection by means of conduits 172 to all three tank structures 1, the conduits 172 connecting with the interiorly disposed conduits 141.

As illustrated in FIGS. 14A and 14B, each pole 164–166 of the circuit interrupter has a current transformer 173 associated therewith, which in response to an overload condition effects the raising of an armature 174 of its respective overload relay 175 to effect closure of the contacts 176 to complete a circuit from the battery 177 to a second three-way valve 178, which controls the operation of all the blast valves 139.

From the foregoing description taken in conjunction with FIGS. 10 and 11, it will readily be apparent how the three-phase interrupter of FIGS. 14A and 14B operates.

Assume first that there is an overload condition existing in any of the three circuits associated with the three poles of the interrupter. The particular overload relay 175 for that particular pole will operate to effect energization of the solenoid 179 to effect actuation of the three-way valve 178. Or should a station attendant desire to effect opening of the interrupter, he need merely push the opening button 180 downwardly. In either of these two contingencies the solenoid 179 will be energized to raise the armature 181 of the three-way valve 178. This will close off the high-pressure conduit 182 and will dump the gas pressure from the top side of the blast valve pistons 183 to permit the gas pressure acting through the conduits 184 to cause opening of all six blast valves 140.

This will cause a blast of gas to pass downwardly through each of the six interrupting units 129 and downwardly through the blast tubes 135, diagrammatically illustrated in FIGS. 14A and 14B. The blast of gas will cause downward opening motion of the six orifice contacts 132 to draw arcs between the orifice contacts 132 and the movable isolating contacts 133. The actuation of all of the blast valves 140 will in turn effect closure of all of the six pressure responsive switches 168, which complete a circuit through the battery 169 to effect energization of the solenoid 170 associated with the three-way valve 171. This will close off the high-pressure conduit 185 leading from one of the tanks 1, and will dump the air pressure in back of all six movable isolating contacts 133 to cause their isolating opening movement against the closing force exerted by the several compression springs 60. The upward movement of the armature 186 will cause a nose portion 187 on the valve rod 188 thereof to latch over a latch 189 which will maintain the three-way valve 171 in its upper position regardless of the deenergization of the solenoid 170 as caused by opening of the open button or deenergization of the overload relay 175 which initially caused the opening operation.

In other words, upon raising of the opening button 180 or deenergization of the overload relay 175 (which initially caused the opening operation), the circuit to the solenoid 179 of the three-way valve 178 will be broken to permit it to move downwardly in response to the tension spring 190, to again cause high pressure gas to pass through the conduit 191 to again effect reclosure of the six blast valves. This will cause the pressure switches 168 to open, breaking the circuit to the solenoid 170 and would tend to effect reclosure of the isolating contacts 133 should the three-way valve 171 be permitted to move downwardly. It is for this reason, namely to maintain the breaker in the open position that the latch 189 is provided. Thus, the maintenance of the three-way valve 171 in its open position will maintain a low pressure in back of each movable isolating contact 133 and will maintain the interrupters open regardless of the previous reclosure of the blast valves.

To effect reclosure of the circuit interrupter one merely needs to press the closing button 192, which will unlatch the valve rod 188 and permit the tension spring 193 to effect opening of the valve 194 to thereby permit high pressure gas to be passed through the conduits 172 to the top sides of each of the movable isolating contacts 133. Reclosure is consequently effected.

Should any of the blast valves 139 become stuck, or for any reason fail to function properly, it is obvious that there would fail to be a blast of gas in that particular interrupting unit. However, because of the arrangement provided, the pressure responsive switch 168 for that particular blast valve would fail to close, and, as a result, the circuit would not be completed to the solenoid 170 of the three-way valve 171. Hence, there would be no operation whatsoever of the three-way valve 171 and all six isolating contacts 133 would remain in their lowered position. This has the advantage that in the particular interrupting unit 129 for which the blast valve 140 failed to operate, there would be no establishment of an arc therein to cause deleterious burning and pitting of the contact surfaces. However, in the other interrupting units 129 whose blast valves 139 do function properly, there will, of course, be a lowering of the respective movable orifice contacts 132 and a consequent interruption of the arc in the other units, although no isolating movement is present in any of the units 129.

From the foregoing description of this particular feature of the invention it will be apparent that the pneumatic control is such as to provide interruption in every unit whose blast valve functions properly, and to prevent arc establishment in any unit whose blast valve functions improperly.

FIGURES 15 and 16 illustrate a novel three-way valve mechanism, generally designated by the reference numeral 196, which may be used with the general type of arc-extinguishing unit of the invention. Referring more particularly to FIG. 15, which illustrates the contact structure of the arc-extinguishing unit 197 in the closed circuit position, it will be observed that the three-way valve 196 is in its leftward open position, wherein high pressure gas from the tank 1 may pass down through the conduit 198 into the valve casing 199 past the valve seat 200 and through the load opening 201 into the conduit 202 and in back of the contact piston 203 of the arc-extinguishing unit 197.

It will be apparent that in the closed circuit position, as shown, the movable contact 203 makes contacting engagement with an orifice-shaped stationary contact 204 which is connected by a flexible conductor 205 with the terminal bushing 2 of the device. The movable contact 203 makes sliding conducting engagement with a conducting cylinder 206 which is electrically connected by a flexible connector 207 to the other terminal bushing 3 of the interrupter.

Similar to the construction set out in FIG. 1 of the drawings, an insulating blast tube 10 is provided having associated therewith an exhaust valve structure 11 at the lower end. This exhaust valve structure 11 may be identical to that set out in FIG. 6 of the drawings, wherein a control conduit 15 is connected to the valve casing 49 of the opening valve 16. Above the valve 16*a*, a conduit 17 is connected to the interior of the casing 1.

Thus, FIG. 15 shows the closed position of the interrupter in which the blast valve 20 is closed and high-pressure gas exists in the region 208 on the back side of the piston contact 203.

The three-way valve 196 comprises two valve elements 209, 210, the first of which is cooperable with the valve seat 200, and the second valve element 210 is cooperable with a valve seat 211 more clearly shown in FIG. 16 of the drawings. A valve rod 212 directly mechanically interconnects the two valve elements 209, 210. The valve element 210, in turn, is fixed to a piston rod 213 which has a stepped-down portion 214, and which is fixed at its right-hand end to a piston 215 of larger diameter than the diameter of the valve element 209. The region 216 to the right of the piston 215, as viewed in FIG. 15, is pneumatically connected by a conduit 217 with the insulating blast tube 10 adjacent the blast valve 20, the purpose for which will be more apparent hereinafter.

The valve body or casing 199 is also provided with an opening 218 to atmosphere, or to a relatively low-pressure region. Also, the valve casing has a flange portion 219 associated therewith which has an aperture 220, the purpose for which will be more apparent hereinafter. Also, a rubber-like gasket seat 221 is provided to cooperate with the piston 215 at the extremity of its leftward movement, as illustrated in FIG. 15. In addition, there is also a conduit 222 interconnecting the region 223 adjacent the left end of the valve casing 199 with the region 216 at the right end of the casing 199 in the position shown in FIG. 15. A closing pilot valve 224 is provided, being spring-biased by a spring 225 over an opening 226, which leads to the region 227 to the left of the piston 215, when the latter is at the right-hand end of the valve casing 199, as more clearly shown in FIG. 16.

The operation of the improved three-way valve is as follows: To effect the opening of the circuit interrupter when the latter is closed, as shown in FIG. 15, the opening valve 16 is actuated, preferably by an energization of its associated solenoid 228. This will cause a raising of the pilot valve 16*a* as illustrated in FIG. 16, to permit high-pressure gas to pass through the conduit 17, through the conduit 15 and into the valve body 18 (FIG. 6) to effect upward opening movement of the blast valve 20. This will permit high-pressure gas from within the tank 1 to pass down through the interrupter casing 230, in a manner illustrated by the arrows 231 in FIG. 16, and through the orifice 232, down through the insulating blast tube 10 and out of the exhaust valve 11.

The reduction of pressure within the region 233, immediately adjacent the blast valve 20, will cause a reduction of pressure within the region 216 (FIG. 15), and will thereby cause a rightward closing movement of the valve assembly 234 to the position indicated in FIG. 16. It will be noted that in this position high-pressure gas will pass through the conduit 222 to the region 227 on the left of the piston 215 to maintain it in its rightward position. The enlarged portion 235 of the piston rod 213 will seal off the opening 220. The high-pressure gas, which was present in back of the piston contact 203, will be permitted to exhaust by way of the conduit 202 to atmosphere through the opening 218. The valve element 209 will seal at the valve seat 200 to prevent a loss of high-pressure gas from the casing 1. The result will be that the piston contact 203 will move upwardly drawing an arc between its lower extremity and the orifice contact 204, such arc being quickly extinguished by the downward flow of gas through the orifice 232.

Suitable means, not shown, effects reclosure of the opening valve 16, and this, in turn, will effect reclosure of the blast valve 20. The pressure within the region 233 adjacent the conduit 217 will then rise to the pressure within the tank 1, and hence the piston 215 will be balanced in its position shown in FIG. 16, it being remembered that the conduit 222 transmits high pressure gas upon its left face, as indicated in FIG. 16. The breaker will then be in the open circuit position with the movable contact piston 203 in the open-circuit position having a reduced pressure therebehind.

To effect the closing of the interrupter, the closing pilot valve assembly 224 is energized by an energization of its coil 236. This will raise the valve 237 away from the opening 226 to permit an exhausting of the region 227 (FIG. 16). In this connection, it will be observed that the opening 226 to atmosphere is larger than the opening 238 leading from the conduit 222. Consequently, the entire valve assembly 234 will quickly move to the extremity of its leftward movement to the position shown in FIG. 15, since high pressure gas exists in the region 216 to the right of the piston 215. When the valve assembly 234 has reached the end of its leftward movement, the communication between the aperture 220 and the stepped down portion 214 of the piston rod 213 will insure that there will be no pressure acting on the left face of the piston 215 when it is in this position, as illustrated in FIG. 15.

It will be noted that during the leftward movement of the piston 215 from the position shown in FIG. 16 that the lower end of the piston 215 has passed over the outlet 238 of the conduit 222 so that the pressure on both sides of the piston 215 will remain unbalanced. Although pressure acts on the left face of the valve element 210, nevertheless since the area of the piston 215 is greater than the area of the valve element 210, the valve assembly 234 will remain in its leftward position until a subsequent actuation of the opening valve 16 and a consequent opening of the blast valve 20 to again reduce the pressure within the conduit 217 in a later opening operation.

From the foregoing description of the three-way valve 196, it will be apparent that there is provided an improved three-way valve for a gas-blast circuit interrupting device which is simple in construction and which operates quickly. Moreover in either the open or closed position of the valve 196 there is no communication between the high-pressure conduit 198 and the opening to atmosphere 218. The valve will remain positively open or positively shut over indefinite periods of time and no fluid will leak from the source 198 to the low pressure reservoir or to atmosphere through the opening 218 when the valve is either open or shut. The valve is actuated to close over the seat 200 by a momentary drop in pressure in an external pneumatic device such as at the lower end of the blast tube 10, and the valve assembly is actuated in the opposite direction by an energization of the closing pilot valve 224. The result is a three-way valve particularly suitable for the type of circuit interrupter under consideration.

From the foregoing description of the invention, it will be apparent that there is provided a novel compressed-gas circuit interrupter in which all the advantages of rigidity in a dead-tank oil circuit breaker are obtained. The interrupters are simple and compact. The weight of the entire breaker is less than other types of power breakers, and the external dimensions are smaller. There is a low installation cost since three independent factory-assembled pole units may be employed with no critical alignment required. In addition, no air bleeding is required to prevent condensation within the interrupter. All of the parts are totally enclosed, with all moving parts enclosed in steel tanks. The type of interrupter which has been described is adapted for the interruption of high power, and one particular rating provides three cycle interruption for five million kva. This particular type is suitable for use on a rated voltage circuit of 115 kv., and has a continuous 60 cycle current rating of 1200 amperes. The interrupting rating is of the order of 26,000 amperes. Thus, the circuit interrupter described has a useful and important commercial application.

It is to be clearly understood that certain features of the invention are applicable to fluid blast interrupters, the term "fluid" covering gases, liquids, vapors and sprays, and not exclusively to gas-blast circuit interrupters.

Although we have shown and described specific structures, it is to be clearly understood that the same were merely for the purpose of illustration, and that changes and modifications may readily be made therein by those skilled in the art without departing from the spirit and scope of the invention.

We claim as our invention:

1. A compressed-gas circuit interrupter including an arc-extinguishing unit having a Venturi throat, means causing a flow of gas through the Venturi throat and through the arc-extinguishing unit, contact means for establishing an arc, operating means for operating the contact means, a gas passage pneumatically interconnecting the Venturi throat with the operating means, and the operating means operating the contact means in response to a reduction of pressure in the gas passage caused by the gas flowing through the Venturi throat.

2. A compressed-gas circuit interrupter including an arc-extinguishing unit having a Venturi throat, means causing a flow of gas through the Venturi throat and through the arc-extinguishing unit, contact means for establishing an arc including an orifice-shaped relatively stationary contact and a cooperable movable contact, operating means for operating the movable contact, a gas passage pneumatically interconnecting the Venturi throat with the operating means, and the operating means operating the movable contact in response to a reduction of pressure in the gas passage caused by gas flowing through the Venturi throat.

3. A fluid blast circuit interrupter including a pair of relatively movable contacts, one of said contacts being a movable isolating contact, a blast valve for causing a flow of fluid past the contacts for extinguishing an arc established therebetween, means for causing an isolating movement of said one contact following extinction of the arc, and means for preventing the isolating movement of said one contact if the blast valve does not function properly.

4. A gas blast circuit interrupter including a pair of relatively movable cooperable contacts, means biasing one of said contacts against the other contact, means reducing the pressure on the back side of said one contact to cause retracting isolating motion thereof, means biasing the other contact into contacting engagement, a blast valve for causing a blast of gas to flow against the conacts to cause the opening movement of said other contact, and means responsive to proper functioning of the blast valve to actuate the second said means.

5. A compressed-gas circuit interrupter including a casing filled with gas under pressure, an arc-extinguishing unit disposed interiorly within said casing, a blast-tube of insulating material interconnecting the arc-extinguishing unit with the region externally of the casing, a blast valve controlling the flow of gas through said blast tube, and one or more cylinders disposed along the blast tube interiorly thereof to prevent depositing of arc products on the inside face of the blast tube.

6. A compressed gas circuit interrupter including a casing filled with gas under pressure, an arc-extinguishing unit disposed interiorly within said casing, a blast tube of insulating material interconnecting the arc-extinguishing unit with the region externally of the casing, a blast valve controlling the flow of gas through said blast tube, a plurality of spaced cylinders disposed along the blast tube interiorly thereof to prevent depositing of arc products on the inside face of the blast tube, and the blast tube being perforated adjacent the gap between said cylinders.

7. The combination in a compressed gas circuit interrupter of a casing filled with gas under pressure, an arc-extinguishing unit disposed within the casing and having a pair of separable contacts associated therewith, one of said contacts being a movable nozzle-shaped contact and the other contact being a movable isolating contact movable following arc interruption, a blast tube pneumatically interconnecting said arc-extinguishing unit with a wall of said casing, a blast valve controlling the exhausting of compressed gas through said blast tube, means including said blast valve for forcing a blast of gas through the arc-extinguishing unit during the interruption period and out of the casing through said blast tube, means for removing the pressure on the backside of said isolating contact following arc extinction to cause its isolating movement, and means for maintaining a reduced pressure on the back side of said isolating contact during the entire opening period of the interrupter.

8. The combination in a circuit interrupter of the fluid-blast type of a pair of relatively movable contacts, means biasing one of the contacts toward the other contact, said one contact being a movable contact generally cup-shaped in configuration, means causing a fluid blast between the contacts to effect arc extinction, means responsive to the fluid blast to effect retracting opening movement of said one contact away from the other contact, and latching means disposed in back of said generally cup-shaped movable contact for mechanically latching said one generally cup-shaped movable contact in the open position.

9. The combination in a circuit interrupter of the fluid-blast type of a pair of relatively movable contacts, means biasing one of the contacts toward the other contact, means causing a fluid blast between the contacts to effect arc extinction, means for effecting a reduction of pressure in back of said one contact to effect its opening movement, latching means for latching said one contact in the open position, piston means for effecting the release of said latching means, and means for increasing the pressure in back of said one contact during the closing operation to effect operation of the piston means and so release the latching means.

10. A fluid-blast circuit interrupter including a pair of relatively movable contacts, a blast tube, blast valve means for causing a flow of fluid against the contacts and through said blast tube, a three-way valve assembly for utilizing pressure to effect contact closure including a pair of valve elements and a piston all movable together, the pair of valve elements controlling the pressure for causing operation of one of said contacts, means initiating blast valve opening to change the pressure within said blast tube, and means causing the piston to be responsive to the pressure within the blast tube adjacent the blast valve.

11. The combination in a fluid-blast circuit interrupter of a pair of relatively movable contacts, means including a three-way valve assembly for controlling the pressure conditions for causing operation of one of said contacts, said three-way valve assembly including a pair of valve elements and a piston all movable together, a valve casing, a pressure inlet, and an exhaust outlet for said valve assembly, a blast tube, blast valve means for causing a flow of fluid against the contacts and through said blast tube, a control conduit connecting said blast tube to one side of said piston, a high-pressure conduit connected to the other side of said piston in one of its positions, and the piston being responsive to the pressure within the blast tube adjacent the blast valve means.

12. A compressed-gas circuit interrupter including a casing filled with gas under pressure, an arc-extinguishing unit disposed interiorly within the casing and having a pair of separable contacts associated therewith, a blast tube pneumatically connecting the arc-extinguishing unit to the region exteriorly of the casing, means for maintaining the contacts in a region of gas pressure in the closed circuit position of the interrupter, a blast valve for controlling the flow of gas out through the blast tube to the region exteriorly of the casing, and means including a Venturi throat associated with the arc-extinguishing unit for reducing the pressure on the back side of one of the contacts during the opening operation.

13. A compressed-gas circuit interrupter including a grounded tank filled with gas under pressure, one or more hollow terminal bushings extending into the tank, a pressurized arc-extinguishing unit disposed within the tank having a pair of cooperable contacts which are maintained under pressure in the closed circuit position of the interrupter, a conduit leading from the arc-extinguishing unit to at least one hollow terminal bushing for the exhaust of gas out through the hollow terminal bushing, and a blast valve associated with the conduit downstream from said cooperable contacts to control the exhaust of gas therethrough.

14. A compressed-gas circuit interrupter including a grounded tank filled with gas under pressure, one or more hollow terminal bushings extending into the tank, a pressurized arc-extinguishing unit disposed within the tank having a pair of cooperable contacts which are maintained under pressure in the closed circuit position of the interrupter, a conduit leading from the arc-extinguishing unit to at least one hollow terminal bushing for the exhaust of gas out through the hollow terminal bushing, a blast valve associated with the conduit downstream from said cooperable contacts to control the exhaust of gas therethrough, and means for reducing the pressure in back of one of the contacts to effect the opening thereof during the opening operation of the interrupter.

15. The combination in a compressed-gas circuit interrupter of a grounded tank having a pair of terminal bushings extending thereinto, the tank being filled with gas under pressure, an arc-extinguishing unit disposed within the tank and having a blast valve disposed adjacent one end thereof, a blast tube connecting the other end of the arc-extinguishing unit with the region exteriorly of the tank, a pair of separable contacts disposed adjacent said other end of the arc-extinguishing unit, biasing means for effecting the opening of one of the contacts, means employing the gas pressure within said tank to maintain said one separable contact closed in opposition to said biasing means, and means dumping the gas pressure acting on the back side of said one contact to effect the opening thereof.

16. The combination in a compressed-gas circuit interrupter of a grounded tank having a pair of terminal bushings extending thereinto, the tank being filled with gas under pressure, an arc-extinguishing unit disposed within the tank and having a Venturi throat adjacent one end thereof, a blast tube pneumatically connecting the other end of the arc-extinguishing unit to the region exteriorly of the tank, a blast valve at tank potential disposed adjacent the outer end of the blast tube to control the flow of gas therethrough, a pair of separable contacts disposed interiorly of the arc-extinguishing unit, and means including the reduction of pressure in the Venturi throat for reducing the pressure in back of one of said contacts and effecting its opening operation.

17. A compressed-gas circuit interrupter including an arc-extinguishing unit having a pair of separable contacts, a hollow contact support for one of the contacts, means biasing said one contact against the other contact, a relatively low pressure conduit having low pressure therein at all times leading to the space within the hollow contact support, a valve plate separate from the movable contact for controlling the exhausting of gas out of the space within the hollow contact support through said low pressure conduit, means normally maintaining the region about the contacts at relatively high gas pressure when they are in the closed-circuit position, and means responsive to the flow of gas through the arc-extinguishing unit to effect opening of the valve plate and thereby effect an exhausting of pressure in the space within the hollow contact support.

18. A compressed-gas circuit interrupter including an arc-extinguishing unit having a pair of separable contacts, a hollow contact support for one of the contacts, means biasing said one contact against the other contact, a relatively low pressure conduit having low pressure therein at all times leading to the space within the hollow contact support, a valve plate separate from the movable contact for controlling the exhausting of gas out of the space within the hollow contact support through said low pressure conduit when they are in the closed-circuit position, means normally maintaining the region about the contacts at relatively high gas pressure, means responsive to the flow of gas through the arc-extinguishing unit to effect opening of the valve plate and thereby effect an exhausting of pressure in the space within the hollow contact support, and sealing means for said one contact to assist in maintaining a reduced pressure in said space in the open circuit position of the interrupter when the valve plate is open.

References Cited in the file of this patent

UNITED STATES PATENTS

| | | |
|---|---|---|
| 1,154,132 | Schrader | Sept. 21, 1915 |
| 1,509,791 | Mershon | Sept. 30, 1924 |
| 1,875,590 | Green | Sept. 6, 1932 |
| 1,957,982 | Smith | May 8, 1934 |
| 2,060,282 | Clerc | Nov. 10, 1936 |
| 2,125,525 | Thommen | Aug. 2, 1938 |
| 2,141,120 | Whitney et al. | Dec. 20, 1938 |
| 2,153,400 | Trencham | Apr. 4, 1939 |
| 2,275,872 | Trencham et al. | Mar. 10, 1942 |
| 2,280,321 | Thommen | Apr. 21, 1942 |
| 2,290,004 | Thommen | July 14, 1942 |
| 2,440,995 | Wilcox | May 4, 1948 |
| 2,447,656 | Ludwig et al. | Aug. 24, 1948 |
| 2,449,518 | Strom | Sept. 14, 1948 |
| 2,459,600 | Strom | Jan. 18, 1949 |
| 2,459,612 | Baker | Jan. 18, 1949 |
| 2,481,996 | Grunewald et al. | Sept. 13, 1949 |
| 2,507,210 | Ludwig et al. | May 9, 1950 |
| 2,517,136 | Schneider | Aug. 1, 1950 |
| 2,568,008 | Jansson | Sept. 18, 1951 |
| 2,574,334 | Latour | Nov. 6, 1951 |
| 2,598,446 | Schneider | May 27, 1952 |
| 2,599,100 | Forwald | June 3, 1952 |
| 2,644,876 | Baker | July 7, 1953 |
| 2,766,348 | Forwald | Oct. 9, 1956 |

FOREIGN PATENTS

| | | |
|---|---|---|
| 533,341 | Great Britain | Feb. 11, 1941 |
| 582,599 | Great Britain | Nov. 21, 1946 |
| 605,163 | Great Britain | July 16, 1948 |
| 991,205 | France | June 20, 1951 |